United States Patent
Taylor et al.

(10) Patent No.: US 9,514,427 B2
(45) Date of Patent: Dec. 6, 2016

(54) GRAPHICAL INTERFACE AND INPUT METHOD FOR ALLOCATING AN INVOICE AMONGST A PLURALITY OF ACCOUNTS

(75) Inventors: Robert Taylor, Toronto (CA);
Alejandro Barrotti, Toronto (CA);
George Konrad, Peterborough (CA);
Zachariah Zahos, Toronto (CA);
Adam Winkels, Toronto (CA)

(73) Assignee: TouchBistro Inc., Toronto (CA)

( * ) Notice: Subject to any disclaimer, the term of this patent is extended or adjusted under 35 U.S.C. 154(b) by 0 days.

(21) Appl. No.: 14/369,591

(22) PCT Filed: Dec. 28, 2011

(86) PCT No.: PCT/CA2011/001426
§ 371 (c)(1),
(2), (4) Date: Jun. 27, 2014

(87) PCT Pub. No.: WO2013/097024
PCT Pub. Date: Jul. 4, 2013

(65) Prior Publication Data
US 2015/0046272 A1    Feb. 12, 2015

(51) Int. Cl.
| | | |
|---|---|---|
| *G06Q 50/12* | (2012.01) | |
| *G06F 3/048* | (2013.01) | |
| *G06Q 10/06* | (2012.01) | |
| *G06Q 30/04* | (2012.01) | |
| *G06F 3/0481* | (2013.01) | |
| *G06F 3/0488* | (2013.01) | |

(52) U.S. Cl.
CPC ......... *G06Q 10/0631* (2013.01); *G06F 3/0488* (2013.01); *G06F 3/04817* (2013.01); *G06Q 30/04* (2013.01); *G06Q 50/12* (2013.01)

(58) Field of Classification Search
CPC ...................................................... G06Q 50/12
USPC .......................................................... 705/15
See application file for complete search history.

(56) References Cited

U.S. PATENT DOCUMENTS

| | | | |
|---|---|---|---|
| 5,602,730 A * | 2/1997 | Coleman et al. ................ | 705/15 |
| 2004/0039701 A1* | 2/2004 | Nakamura et al. ............. | 705/42 |
| 2005/0043996 A1* | 2/2005 | Silver ..................... | G06Q 10/02 705/15 |
| 2006/0229984 A1* | 10/2006 | Miyuki ........................... | 705/40 |
| 2009/0037286 A1* | 2/2009 | Foster ............................. | 705/21 |
| 2015/0339740 A1* | 11/2015 | Sherman ................ | G06Q 30/04 705/40 |

OTHER PUBLICATIONS

International Search Report issued by the Canadian Intellectual Property Office dated Jul. 31, 2012 for corresponding PCT International Application No. PCT/CA2011/001426 filed Dec. 28, 2011.

(Continued)

*Primary Examiner* — Scott Zare
(74) *Attorney, Agent, or Firm* — Perry + Currier Inc.

(57) ABSTRACT

A novel graphical interface and input method is provided. In certain implementations, a touch screen interface is provided with a plurality of icons that each represent seats around a table in a restaurant. Each icon is associated with a unique account. Accounts can be easily merged and split by using touch and swipe interfaces with the icons.

20 Claims, 23 Drawing Sheets

(56) References Cited

OTHER PUBLICATIONS

Written Opinion of the International Searching Authority issued by the Canadian Intellectual Property Office dated Jul. 31, 2012 for corresponding PCT International Application No. PCT/CA2011/001426 filed Dec. 28, 2011.
Manager POS Guide: Squirrel Version 1.5x, Apr. 21, 2009 available at http://cabaretsystems.com/pdf/1.55/Manager%20POS.pdf.
Amigo POS 7 USer Manual, Dec. 19, 2011 available at: http://www.amigopos.com/Support/PDFUserManual.aspx.

"Splitting the bill with Microsoft Surface", POS Wizard, Nov. 20, 2008, Internet archive: http://web.archive.org/web/20081120162306/http://pos-wizard.com/2007/05/splitting-the-bill-with-microsoft-surface/.

* cited by examiner

GRAPHICAL INTERFACE AND INPUT METHOD FOR ALLOCATING AN INVOICE AMONGST A PLURALITY OF ACCOUNTS

FIELD

The present invention relates generally to electronic apparatus and more specifically relates to a graphical interface and input method for allocating an invoice amongst a plurality of accounts.

BACKGROUND

The computer-age is still relatively new, and technological innovation for computers has seen a greater emphasis on increasing hardware resources such as memory and processing, or efficiently utilizing those resources when they are scarce. With the maturation of hardware and software programming techniques, increasing efforts are being made to improve usability. As but one recent example, tablet computers have recently had a massive impact on the configurations of electronic apparatuses available on the market, and have the potential to supplant a certain amount of the traditional laptop and notebook market. Much of that impact has been attributed to usability, as tablet computers frequently incorporate voice recognition, touch screens and accelerometers, eschewing the traditional keyboard and mouse.

The proliferation of small, mobile computing form factors has also made it difficult to rely on the traditional keyboard and mouse as input devices. Accordingly, touch screens are commonly deployed and software is responsive to various swipe gestures involving the sweeping of the thumb or fingers over the touch screen surface. Conveniently, swipe gestures can obviate the need for a mouse, trackpad or other pointing device. However, not all mouse functionality can be elegantly substituted with swipe gestures. For example, implementing the "right click" or "scroll wheel" functionality using swipe gestures has resulted in the development of highly complex swipe gestures that can require the use of multiple fingers, thereby interfering with the very usability gains originally contemplated by the deployment of swipe gestures.

One application for electronic apparatus is the generation and processing of invoices. As but one example, the hospitality industry can have particularly complex invoicing needs as the accumulation of beverage and food orders can occur over a number of hours, with small discrete interactions being required to increment the invoice total in accordance with the beverages and food that are served. There is further complexity introduced when a party requests that the final invoice be divided individually, or according to certain groups. Current point of sale technology is awkward and clumsy in its handling of these complexities.

SUMMARY OF THE INVENTION

An object of the present invention is to obviate or mitigate at least one disadvantage of the prior art.

One aspect of the invention provides a computer-implemented method for defining one or more accounts for invoicing goods or services. A first icon is generated on a computer display and a first account is defined in memory respective to the first icon. As second icon is generated on a computer display and a second account is defined in memory respect to the second icon. A first input is received, via an input device, representing an initial selection of the first icon. A second input is received, via the input device, representing continued selection of the first icon. A third input is received, via said input device, representing a final selection of the second icon. In response to the first, second and third inputs, the first account and the second account are merged into a single account.

In another aspect, the invention provides an apparatus configured to implement a computer-implemented method for defining one or more accounts for invoicing goods or services. A first icon is generated on a computer display and a first account is defined in memory respective to the first icon. As second icon is generated on a computer display and a second account is defined in memory respect to the second icon. A first input is received, via an input device, representing an initial selection of the first icon. A second input is received, via the input device, representing continued selection of the first icon. A third input is received, via said input device, representing a final selection of the second icon. In response to the first, second and third inputs, the first account and the second account are merged into a single account.

BRIEF DESCRIPTION OF THE DRAWINGS

Various embodiments of the present invention will now be discussed, by way of example only, with reference to the attached Figures in which:

FIG. 8 shows example set identifiers for use by the display and processor of the apparatus of FIG. 1 during example performance of certain blocks of the method of FIG. 3.

DETAILED DESCRIPTION OF THE EMBODIMENTS

Figure 1:
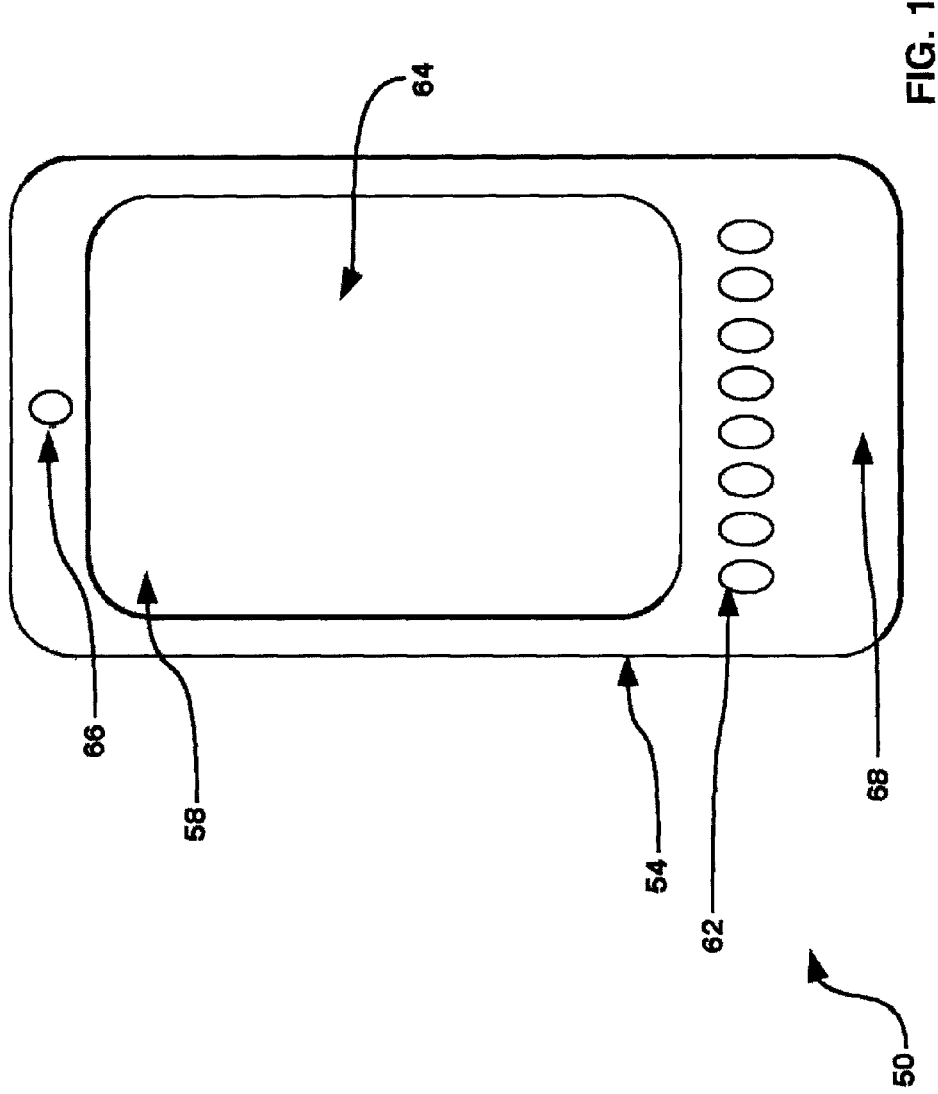
FIG. 1 is a schematic representation of a front view of a portable electronic apparatus.

Referring now to FIG. 1, shows a schematic representation of a portable electronic apparatus indicated generally at 50. It is to be understood that portable electronic apparatus 50 is an example, and it is to be understood that a variety of different portable electronic apparatus structures are contemplated. In a present embodiment, portable electronic apparatus is a tablet computer. However, depending on the industry or application of the teachings herein, variations on portable electronic apparatus 50 can include, without limitation, a cellular telephone, a portable email pager, a camera, a portable music player, a portable video player, a portable video game player. Other contemplated variations include apparatus which are not necessarily portable, such as desktop computers, laptop computers, note book computers, or console computers mounted to or within a vehicle dashboard.

As shown in FIG. 1, apparatus 50 comprises a chassis 54 that supports a display 58. Display 58 can comprise one or more light emitters such as an array of light emitting diodes (LED), liquid crystals, plasma cells, or organic light emitting diodes (OLED). Other types of light emitters are contemplated. Chassis 54 also supports an keyboard 62, though as will be discussed further below, keyboard 62 is optional. Where a keyboard is utilized, it is to be understood that this invention is not limited to any particular structure, spacing, pitch or shape of keyboard 62, and the depiction in FIG. 1 is an example. Apparatus 50 also comprises touch sensitive membrane overlaid upon display 58. In a present embodiment, apparatus 50 also comprises a speaker 66 for generating audio output, and a microphone 68 for receiving audio input, although, speaker 66 and microphone 68 are also optional.

Figure 2:
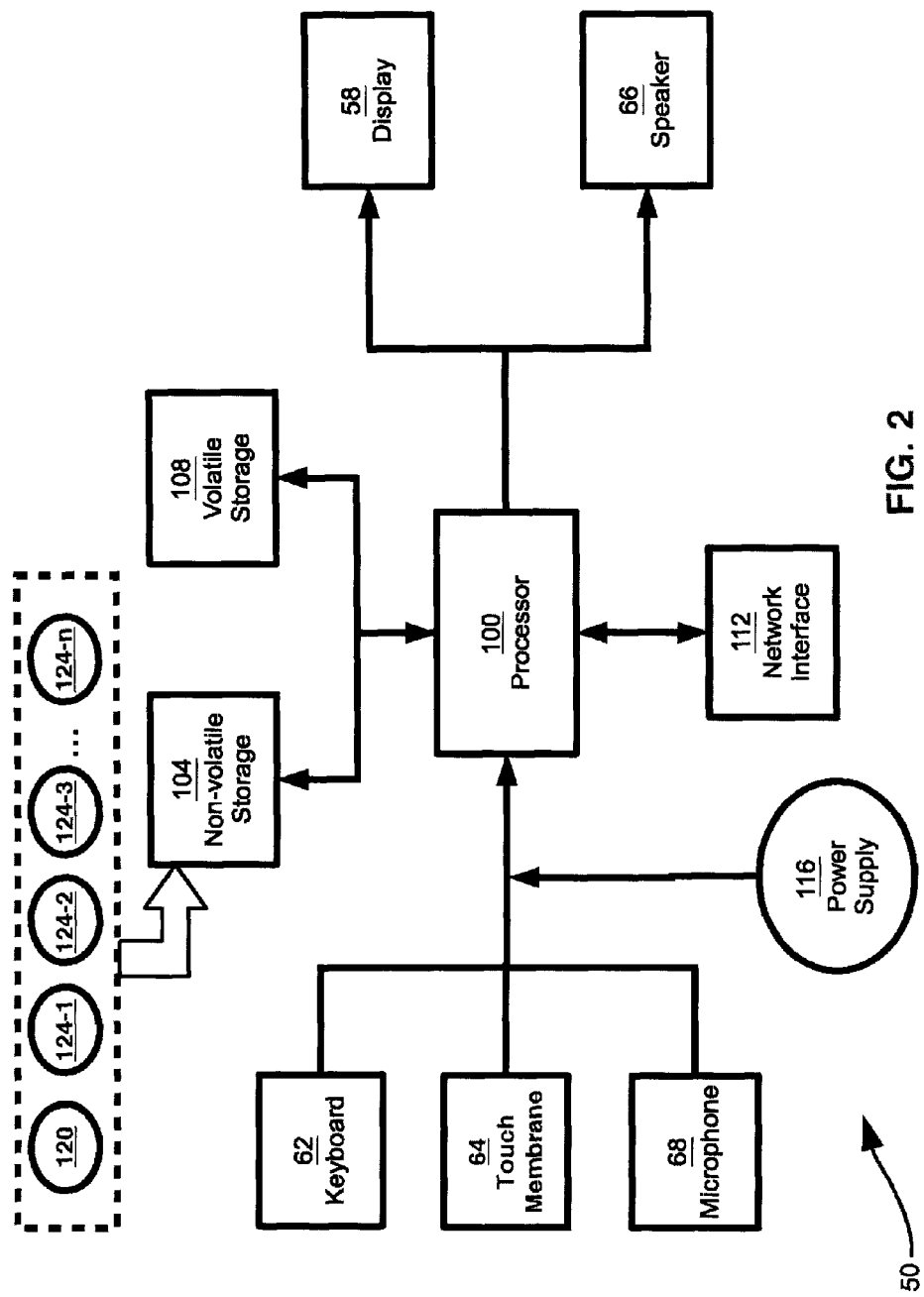
FIG. 2 is a block diagram of the electronic components of the device shown in FIG. 1.

FIG. 2 shows a schematic block diagram of the electronic components of apparatus 50. It is to be emphasized that the structure in FIG. 2 is a non-limiting example. As shown in FIG. 2, the block components of apparatus 50 contemplate a plurality of input devices which in a present embodiment includes keyboard 62, touch membrane 64, and microphone 68. Inputs from keyboard 62, touch membrane 64 and microphone 68 are received at processor 100. Processor 100 can be implemented according to any desired configuration, such as a single processor, or a plurality of processors or one or more multi-core processors. Generally speaking, processor 100 can be configured to execute different programming instructions responsive to the input signals received via the various input devices. To fulfill its programming functions, processor 100 is also configured to communicate with one or more storage units, implemented in the present embodiment as a non-volatile storage unit 104 (e.g. Erase Electronic Programmable Read Only Memory ("EEPROM"), Flash Memory) and a volatile storage unit 108 (e.g. random access memory ("RAM"). Programming instructions that implement the teachings of apparatus 50 as described herein are typically maintained, persistently, in non-volatile storage unit 104 and used by processor 100 which makes appropriate utilization of volatile storage 108 during the execution of such programming instructions.

Processor 100 in turn is also configured to control display 58 and speaker 66, also in accordance with different programming instructions, such control optionally being in response to different input received from the various input devices.

Processor 100 also connects to a network interface 112, which can be implemented in a present embodiment as a radio configured to communicate over a wireless link, although in variants apparatus 50 can also include a network interface for communicating over a wired link. Network interface 112 can thus be generalized as a further input/output device that can be utilized by processor 100 to fulfill various programming instructions. It will be understood that interface 112 is configured to correspond with the network architecture that defines such a link. Present, commonly employed network architectures for such a link include, but are not limited to, Global System for Mobile communication ("GSM"), General Packet Radio Service ("GPRS"), Enhanced Data Rates for GSM Evolution ("EDGE"), 3G, High Speed Packet Access ("HSPA"), Code Division Multiple Access ("CDMA"), Evolution-Data Optimized ("EVDO"), Institute of Electrical and Electronic Engineers (IEEE) standard 802.11, Bluetooth™ or any of their variants or successors. It is also contemplated each network interface 112 can include multiple radios to accommodate the different protocols that may be used to implement different types of links.

Apparatus 50 also includes a power supply 116 which can be implemented as a battery or other electrical power source. For convenience, in FIG. 2, power supply 116 is shown as connecting to a bus that inputs into processor 100, but it is to be understood that power supply 116 is an available source of electrical energy for all of the components in apparatus 50.

As will become apparent further below, apparatus 50 can be implemented with different configurations and form-factors other than that which are expressly described herein. For example, certain input devices can be omitted (e.g. keyboard 62), or other input devices can be included (e.g. a proximity detector such as a bar code scanner or a near field communication device). Likewise certain output devices can be omitted, or other output devices can be included (e.g. haptic devices). Furthermore, network interface 112 can also be eliminated. However, a common feature of any apparatus 50 used to implement the teachings of this invention includes at least one touch membrane 64 overlaid on display 58 and accompanying processing and storage structures.

In a present embodiment, device 54 is also configured to maintain, within non-volatile storage 104, at least one invoicing application 120. As will be explained further below, invoicing application 120 can be pre-stored in non-volatile storage 104 upon manufacture of apparatus 50, or downloaded or updated via network interface 112 and saved on non-volatile storage 104 at any time subsequent to manufacture of apparatus 50. One or more additional software modules 124-1, 124-2, 124-3, . . . , 124-n such as operating system(s), drivers, additional applications, and the like, can also be stored within non-volatile storage 104, for use by processor 100, as needed or desired to provide functionality to apparatus 50. (Note that additional software modules 124-1, 124-2, 124-3 . . . , 124-n are hereafter referred to generically as software module 124, and collectively as software modules 124. This nomenclature is used elsewhere herein.)

Processor 100 is configured to execute invoicing application 120 and other software modules 124 as needed. In one general aspect of this invention, as will be explained further below, processor 100 is configured, while executing invoicing application 120, to control display 58 in response to varying input signals received from touch membrane 64.

Figure 3:
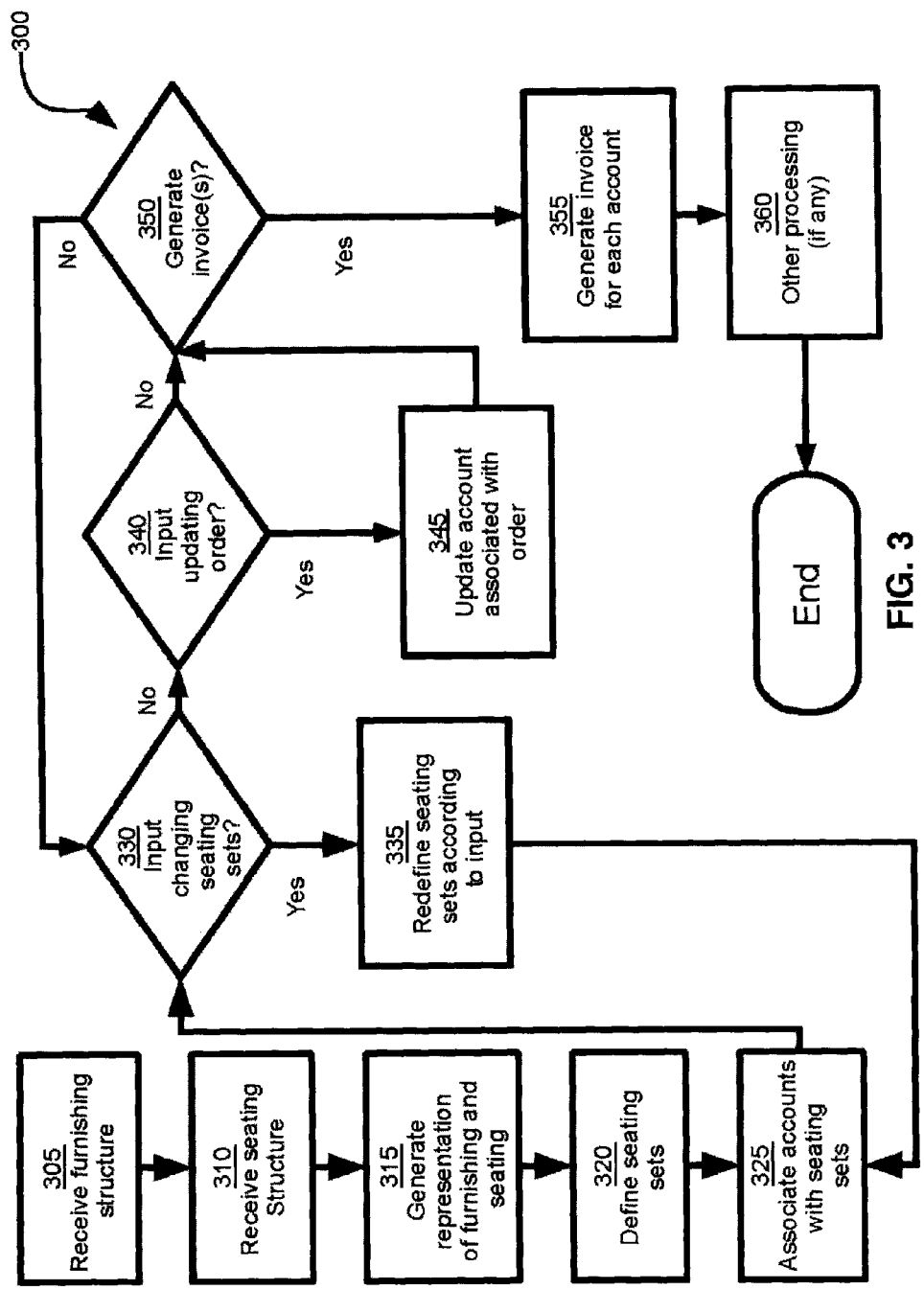
FIG. 3 is a flowchart for a method for controlling a display in response to input that can be implemented on the apparatus of FIG. 1.

Referring now to FIG. 3, a flowchart depicting a method for controlling a display in response to input is indicated generally at 300. Method 300 is one way to implement invoicing application 120 for execution on processor 100. By way of some further background, it is assumed that electronic apparatus 50 and method 300 are utilized in a hospitality establishment, such as a restaurant, bar, pub, bistro, tavern, cafeteria or the like, as part of a point of sale system for such an establishment. In such a configuration, electronic apparatus 50 can replace the use of a traditional pad of paper that is normally used by wait-staff to take orders.

It is to be emphasized, however, that method 300 can be varied and that method 300 need not be performed in the sequence as shown, hence the reference to "blocks" rather than "steps". Indeed some blocks may be performed in parallel. To assist in discussion of method 300, a specific example to its performance will be discussed in relation to apparatus 50, and application 124 from FIG. 1 and FIG. 2.

Figure 4:
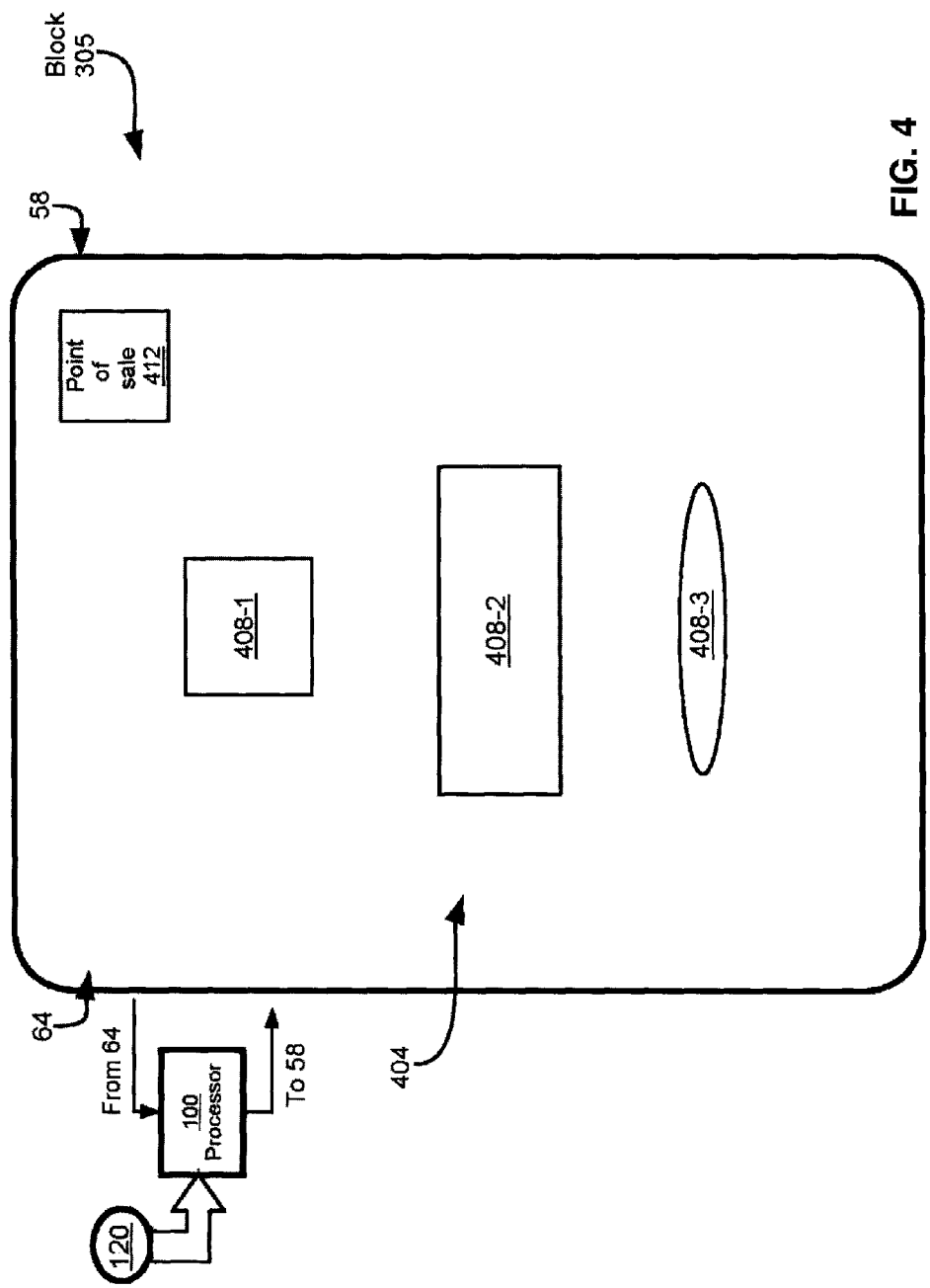
FIG. 4 shows the display and processor of the apparatus of FIG. 1 during example performance of certain blocks of the method of FIG. 3.

Block 305 comprises receiving a representation of a furnishing structure. In a present embodiment, the furnishing structure can reflect one or more of the tables or bar seating structures found in a hospitality establishment. In a presently preferred embodiment, a graphical layout is provided with a facsimile arrangement of the relevant hospitality establishment. FIG. 4 shows an example of a hospitality establishment layout 404, comprising a plurality of furnishings 408. Furnishing 408-1 represents a square table, furnishing 408-2 represents a rectangular table, while furnishing 408-3 represents a bar 408-3. It is to be re-emphasized that hospitality establishment layout 404 is a non-limiting example, and is highly simplified for illustrative purposes. It is contemplated that an invoicing application 120 can include a configuration tool whereby any furnishing layout representation can be created and stored within invoicing application 120, such that upon invocation of block 305, the graphical furnishing layout of the hospitality establishment layout 404 is generated on display 58. Additional features can, if desired, be provided in the layout 404, including, for example, the location of a point of sale terminal 412, to assist in usability of the layout. Layout 404 can also be generated to include other features to further enhance usability, including doors, windows, patio, restrooms and the like, keeping in mind that extraneous clutter can also impair usability.

Figure 5:
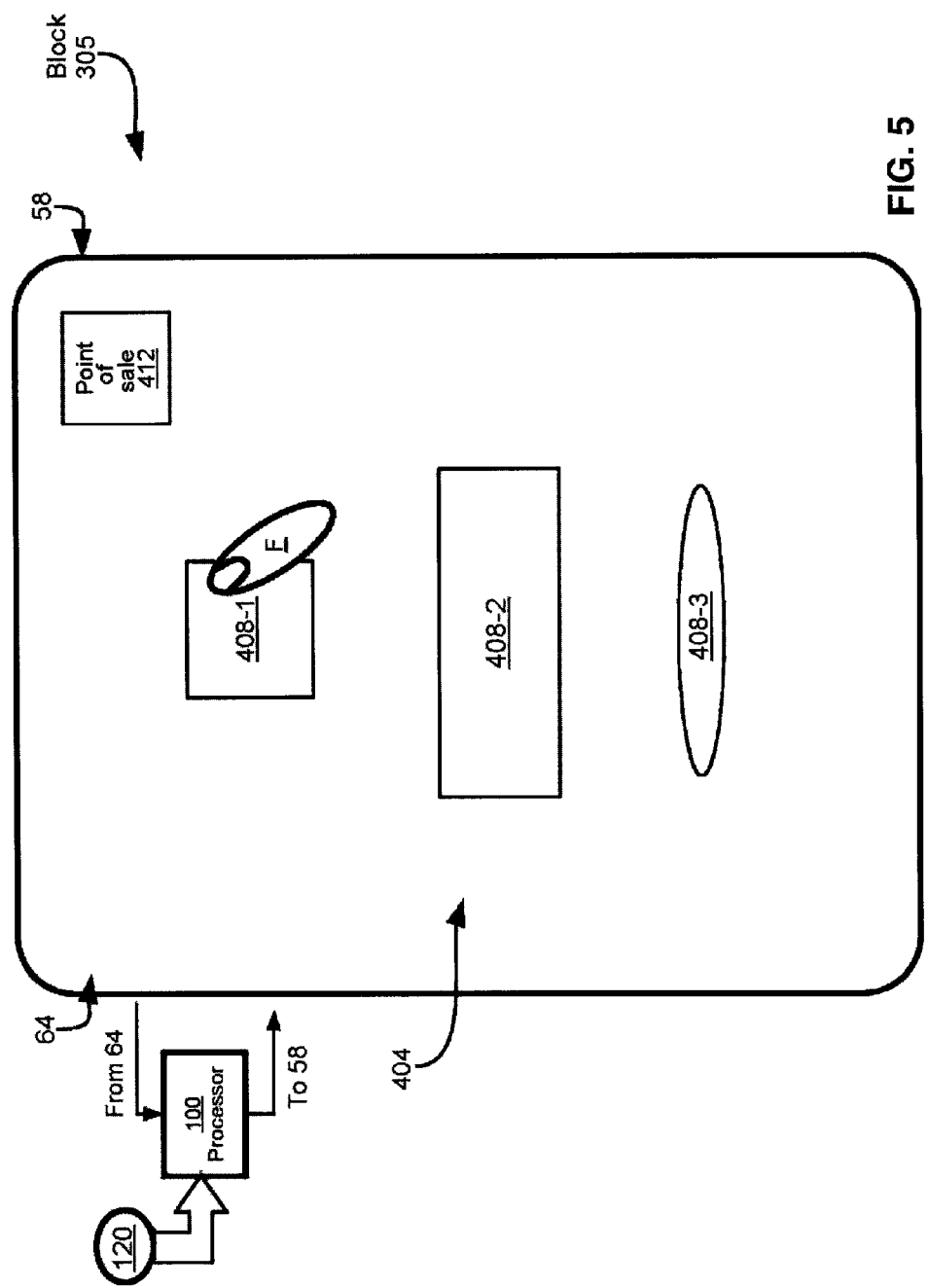
FIG. 5 shows the display and processor of the apparatus of FIG. 1 during example performance of certain blocks of the method of FIG. 3.
Figure 6:
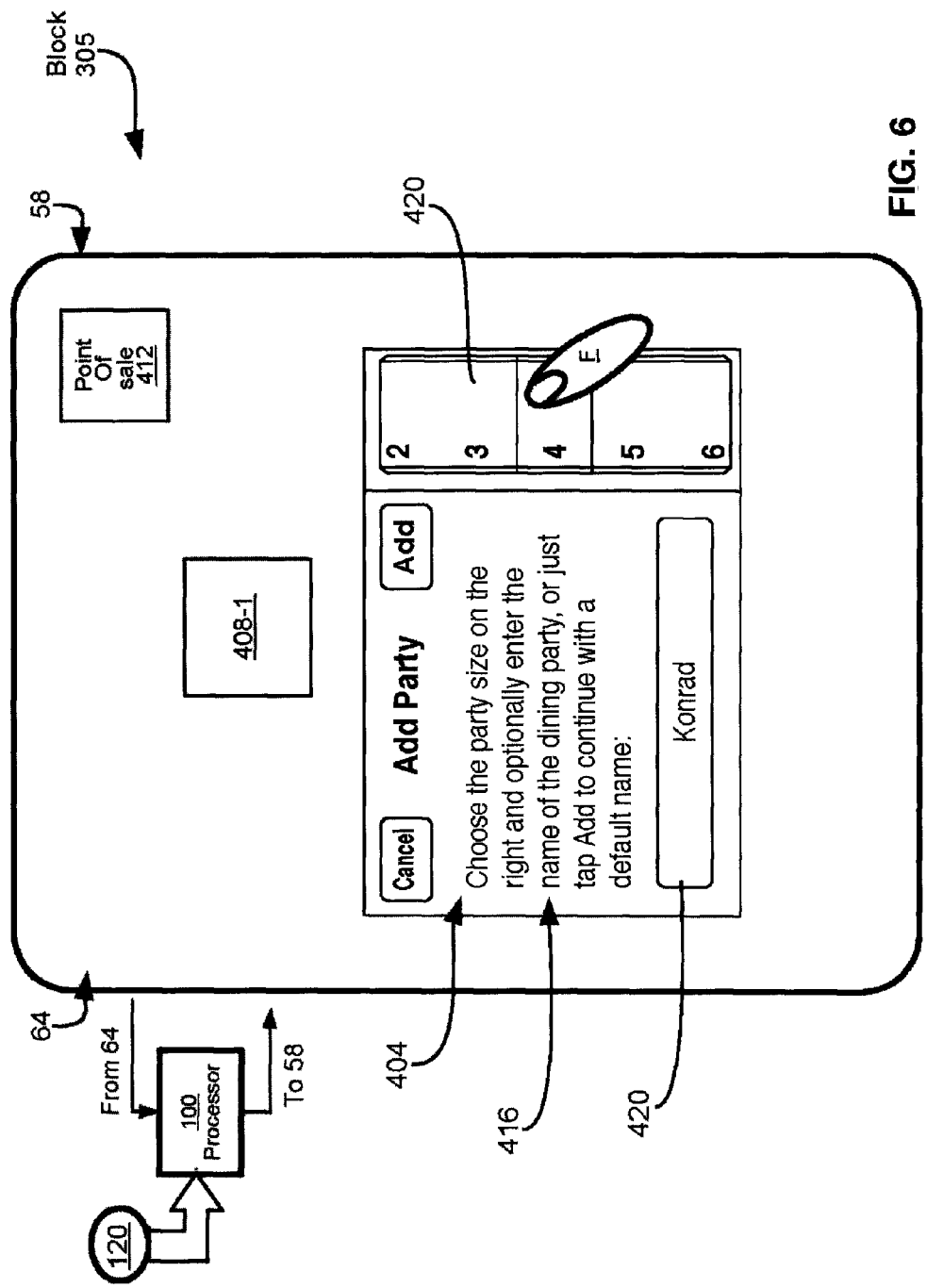
FIG. 6 shows the display and processor of the apparatus of FIG. 1 during example performance of certain blocks of the method of FIG. 3.

In a present embodiment, furnishings 408 are interactive. Such interactivity is reflected in various other blocks of method 300. For example, in certain implementations of application 120, block 310 can be responsive such interactivity. In general terms, block 310 comprises receiving a seating structure. This can be achieved in a number of ways, such as by predefining the number of seats associated with a particular furnishing 408. However, the number of seats associated with a particular furnishing 408 can also be dynamic, which reflects a presently preferred implementation shown in FIG. 5. In relation to the specific example shown in FIG. 4, the functionality of block 310 can be implemented by first receiving a selection of a particular furnishing 408 and then offering a graphical interface that can be used to define a seating structure for that furnishing 408. FIG. 5, as an example, shows furnishing 408-1 being selected by depressing touch membrane 64 (with, for example, a finger F) in a location above furnishing 408-1. FIG. 6 continues the example by showing a dialog box 416 whereby a name field 420 is provided to indicate the name of the party that will be occupying furnishing 408-1, and a wheel-spinner interface 420 is provided to permit selection of the number of seats that will be occupied in association with furnishing 408-1. According to the present illustrative example, four seats are selected. An "Add" button is provided to indicate completion of the entry of the dialog box (thereby continuing method 300), and a "Cancel" button is also provided (thereby ending method 300) to return to the view shown in FIG. 4 at which point another furnishing 408 can be selected. In a present implementation, populating the name field is optional. Note that other types of interfaces that achieve the same function as dialog box 416 are contemplated, and so dialog box 416 should be understood to be a non-limiting example.

Figure 7:
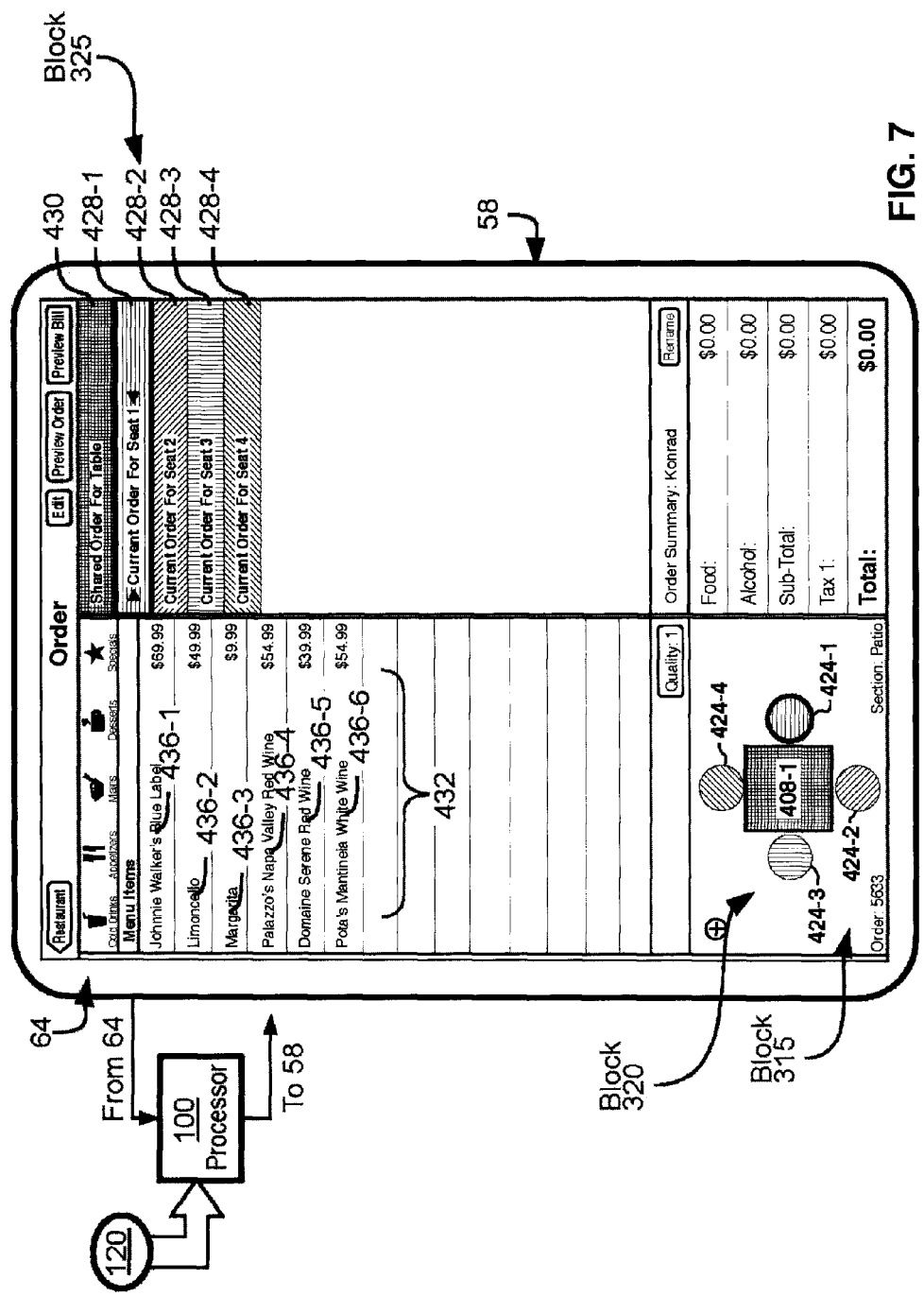
FIG. 7 shows the display and processor of the apparatus of FIG. 1 during example performance of certain blocks of the method of FIG. 3.

Block 315 comprises generating a representation of furnishing and seating. Input from block 305 and block 310 can be used to effect block 315. In general terms, a graphical representation of a furnishing from block 305, in association with a seating structure from block 310, is graphically generated on display 58. Example performance of block 315, using the example from above, is shown in FIG. 7, whereby furnishing 408-1 is now shown with four seats 424, one on each side of furnishing 408-1, the number of seats corresponding with the selected number of seats from FIG. 6.

Block 320 comprises defining one or more seating sets. In the present example implementation, initially four sets are created, with one set for each seat 424. (This initial programming assumption is not necessary and in other embodiments the assumption could be handled differently: for example, a single set for all seats 424 could be created.) While sets can be programmatically defined using any identification technique, a present implementation contemplates the use of colours.

Figure 8:
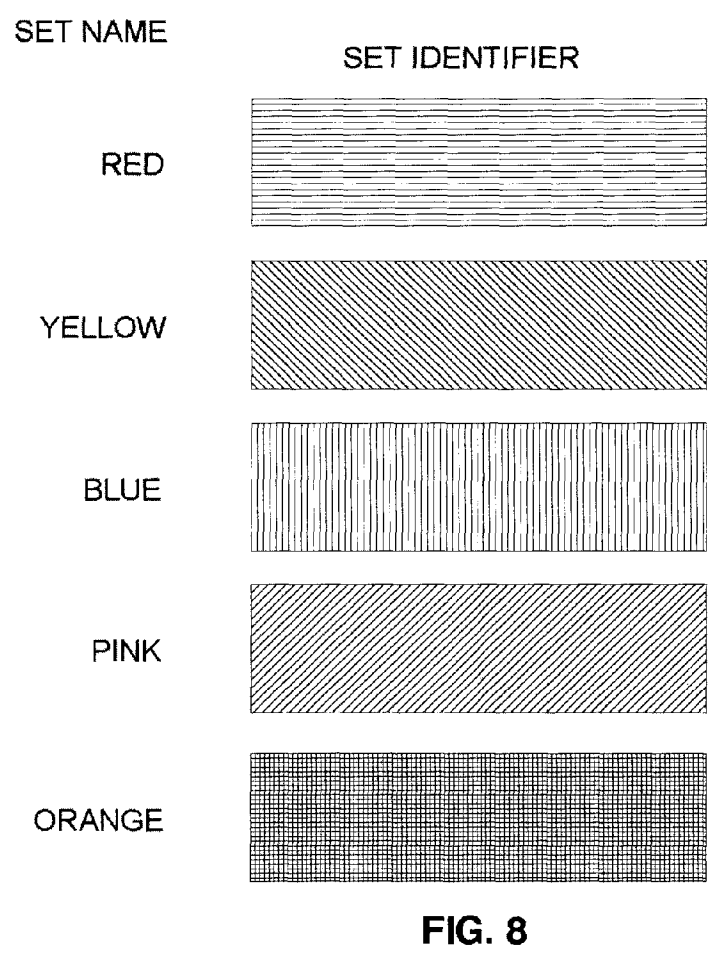

Referring briefly to FIG. 8, in a present implementation, five example sets are contemplated; namely a Red Set represented in the figures using horizontal hatching; a Yellow Set represented using top-left to bottom-right diagonal hatching; a Blue Set represented by vertical hatching; a Pink Set represented using bottom-left to top-right diagonal hatching; and a Orange Set represented by cross hatching. These hatching schemes will be used again and referred to throughout this specification, but they are non-limiting examples. Indeed, where display 58 is black and white, then such hatching can be used, but more typically, display 58 will be a colour display and so actual colours corresponding to the set name can be used on display 58. Other indicia, other than hatching or colouring, or differing hatching or colouring, will now occur to the person skilled in the art.

Referring back again to FIG. 7, as part of the initial performance of block 320, seat 424-1 is initially defined to be part of the red set and therefore is depicted with the "red" hatching scheme shown in FIG. 8. Seat 424-2 is initially defined to be part of the yellow set and therefore is depicted with the "yellow" hatching scheme shown in FIG. 8. Seat 424-3 is initially defined to be part of the blue set and therefore is depicted with the "blue" hatching scheme shown in FIG. 8. Seat 424-4 is initially defined to be part of the pink set and therefore is depicted with the "pink" hatching scheme shown in FIG. 8. While not required, in a present embodiment it is also contemplated that a fifth set (hereafter referred to as a furnishing set) is also assigned to furnishing 408-1 itself, depicted with the "orange" hatching scheme shown in FIG. 8.

Also as part of invoicing application 120, a scheme is provided to indicate which of the four seats 424 are currently selected, and which are deselected. A presently contemplated approach, illustrated in FIG. 7, comprises the use of a bolded outline of the seat, the bolding surrounding the hatching scheme corresponding to the set colour. Thus, in FIG. 7, the currently selected seat 424-1 is not only depicted with the "red" hatching scheme, but it is depicted with the selected red hatching scheme whereby it is shown with a bolded outline. In contrast, the remaining seats 424-2, 424-3 and 424-4 are shown without a bolded outline in accordance with their respective unselected yellow, blue and pink schemes whereby they are shown without bolded outlines. In a present embodiment, different seats 424 can be selected by a touch gesture by pressing the desired seat 424. The selection of a given seat 424 will also automatically cause the remaining seats to be unselected. The significance of a given seat 424 being selected, or unselected, will become more apparent from the subsequent discussion.

Block 325 comprises associating accounts with each defined seating set. Continuing with the present example, example individual accounts 428 are graphically represented in FIG. 7, in addition to a shared account 430. (It is to be understood that, as is the case with other processing blocks in method 300, processor 100 is ultimately controlling display 58 and utilizing non-volatile storage 104 and/or volatile storage 108 to effect block 325.) In general terms, each account 428 comprises a software structure that uniquely identifies the seating set, as well as a field to accommodate an identification of an individual seat 424 within that seating set, and any chargeable items that are associated with each seat 424 within the set. Chargeable items, in the present embodiment, include items ordered from a menu 432 comprising a plurality of consumable items 436 representing food or beverages. Each account 428 also comprises a field to accommodate identification and division of shared chargeable items as stored within shared account 430, that amount being ultimately populated with a value equaling the division of the amount stored in the furnishing set by the total number of sets.

The association between each account 428 and its respective seat 424 is represented graphically by the use of a hatching scheme that is identical for account 428 and its respective seat 424. More particularly, in FIG. 7, it can be noted that account 428-1 has the same hatching as seat 424-1; account 428-2 has the same hatching as seat 424-2; account 428-3 has the same hatching as seat 424-3; and account 428-4 has the same hatching as seat 424-4. Likewise, furnishing 408-1 has the same hatching as shared account 430.

Block 330 comprises determining if input has been received that represents an instruction to change the presently defined seating sets. In general terms, instructions can be provided at block 330 to cause at least one seat 424 to be associated with at least one other seat 424 resulting in one or more merged sets. Alternatively, instructions can be provided at block 330 to cause any seats 424 that are currently merged into one set to be divided into separate sets. If such instructions are received, then a "yes" determination is made at block 330 leading to block 335.

Figure 9:
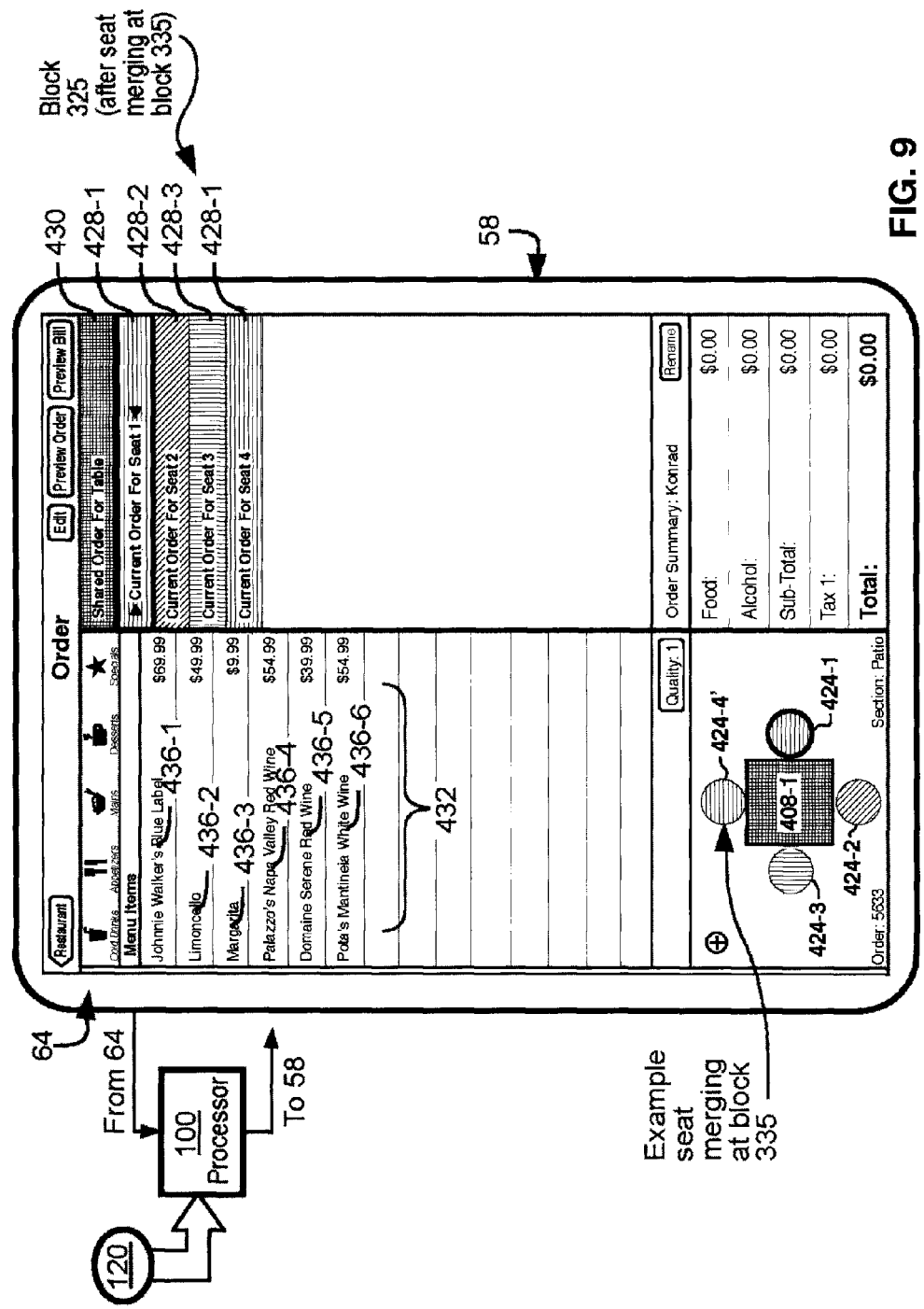
FIG. 9 shows the display and processor of the apparatus of FIG. 1 during example performance of certain blocks of the method of FIG. 3.

At block 335, seating sets are redefined according to the input received at block 330. An example of a result of performance of block 335 is shown in FIG. 9. FIG. 9 is state reflecting a transition from the state shown in FIG. 7 to the state in FIG. 9. In FIG. 9, seat 424-4, now labeled as seat 424-4', has been merged into the Red Set. Note the Red set was originally associated only with seat 424-1 in FIG. 7. As a result, the Pink Set has been removed in FIG. 9. From this pass through block 335, a return is made to block 325 at which point accounts 428 are again associated with seating sets, though during this pass the accounts are associated with seating sets based on the set redefinition that just occurred at block 335. An example performance of block 325 is also shown FIG. 9, whereby account 428-4 has been removed, and now seat 424-1 and seat 424-4' are both associated with account 428-1.

Figure 10:
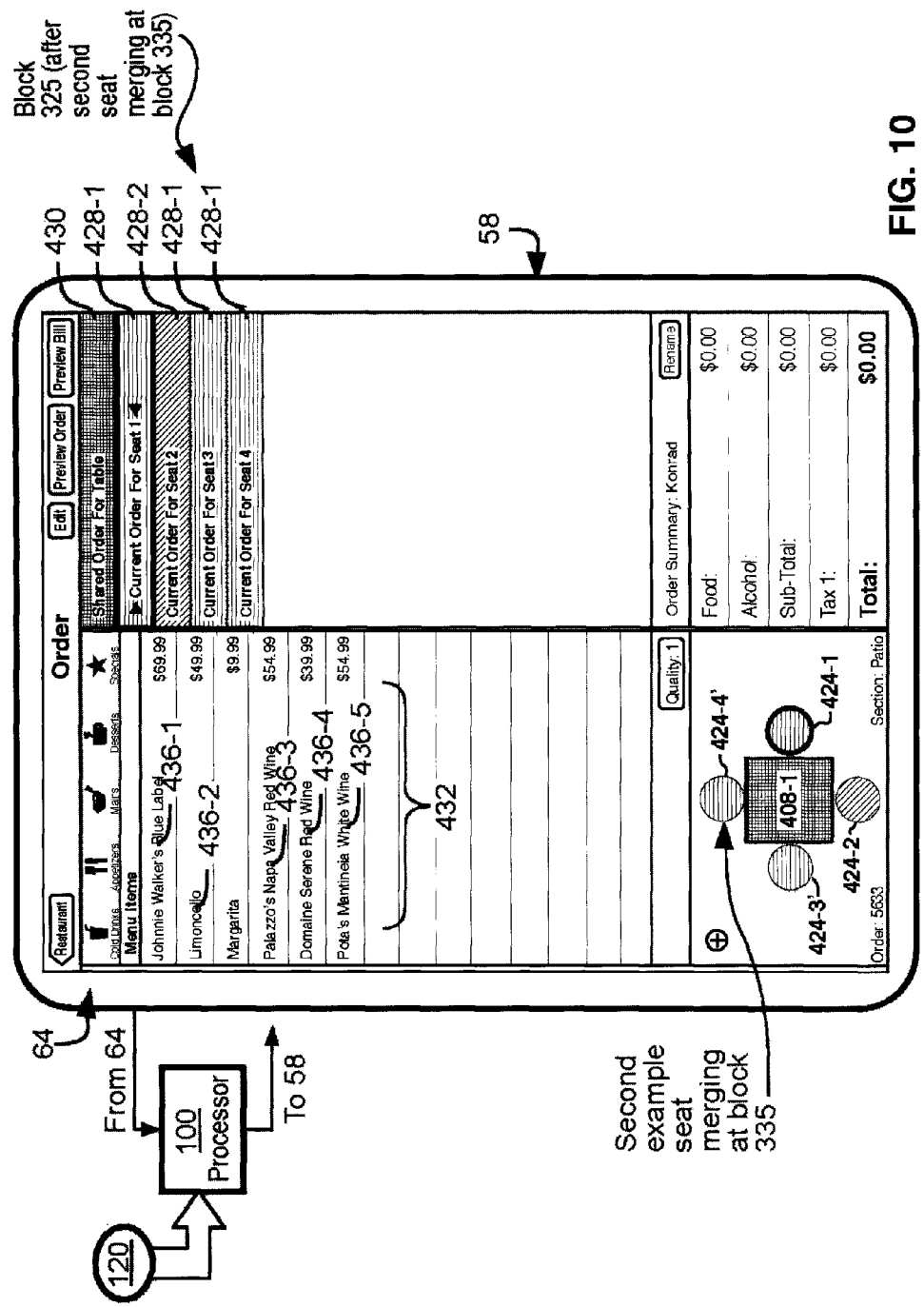
FIG. 10 shows the display and processor of the apparatus of FIG. 1 during example performance of certain blocks of the method of FIG. 3.

To further illustrate block 335, a second example of seat merging, resulting from performance of block 335, is shown in FIG. 10. FIG. 10 reflects a transition from the state shown in FIG. 9 to the state shown in FIG. 10. In FIG. 10, seat 424-3, now labeled as seat 424-3', has been merged into the Red Set, which was originally associated with only seat 424-1 in FIG. 7, and was associated with both seat 424-4' and seat 424-1 in FIG. 9. As a result, the Blue Set has been removed in FIG. 10. From this pass of block 335, a return is made to block 325 at which point accounts 428 are again associated with seating sets based on the set redefinition at block 335. An example performance of block 325 is also shown FIG. 10, whereby account 428-3 has been removed, and now seat 424-1, seat 424-4' and seat 424-3' are all associated with account 428-1.

Figure 11:
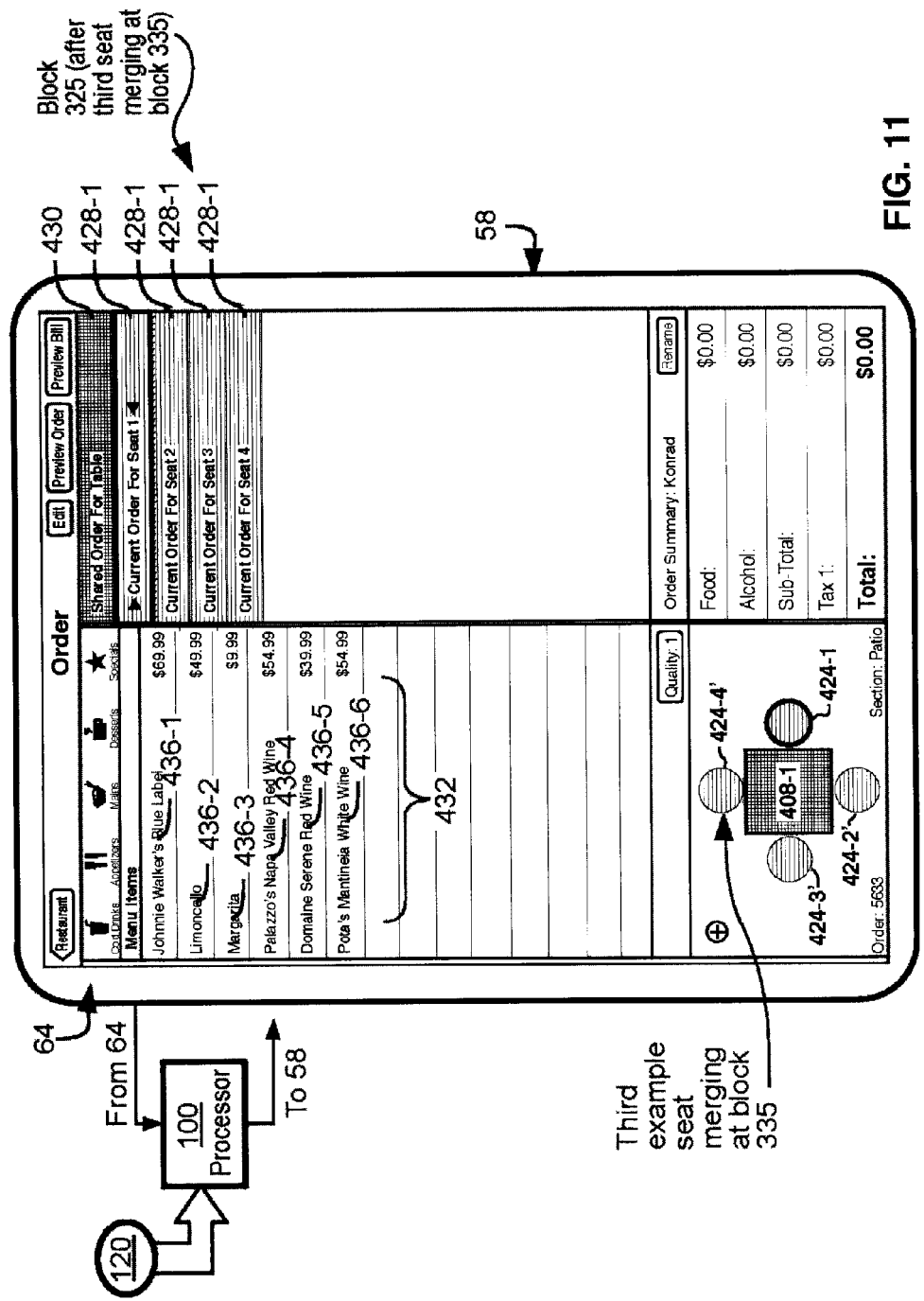
FIG. 11 shows the display and processor of the apparatus of FIG. 1 during example performance of certain blocks of the method of FIG. 3.

To further illustrate block 335, a third example of seat merging, resulting from performance of block 335, is shown in FIG. 11. FIG. 11 reflects a transition from the state shown in FIG. 10 to the state shown in FIG. 11. In FIG. 11, seat 424-2, now labeled as seat 424-2', has been merged into the Red Set, which was previously only associated with seat 424-4', seat 424-3' and seat 424-1 in FIG. 9. As a result, the Yellow Set has been removed, and now only the Red Set remains. From this pass of block 335, a return is made to block 325 at which point accounts 428 are associated with seating sets based on the set redefinition at block 335. An example performance of block 325 is also shown FIG. 11, whereby account 428-2 has been removed, and now seat 424-1, seat 424-4', seat 424-3' and seat 424-2' are all associated with account 428-1. Those skilled in the art will now recognize that an invoice generated according to the single account 428-1 shown in FIG. 11 reflects the usual 'single bill for the table' paradigm in restaurants, whereby if the patrons wish to share the bill according to their purchases, then the patrons are left to perform such calculations on their own. (Note that the terms "bill" and "invoice" may be used interchangeably in this specification. The term "bill" is often used on the graphical interfaces for improved usability, but the term "invoice" is used to more generally denote that the present specification may be applied to other applications, other than the hospitality industry, where the term "invoice" might be used instead.)

Figure 12:
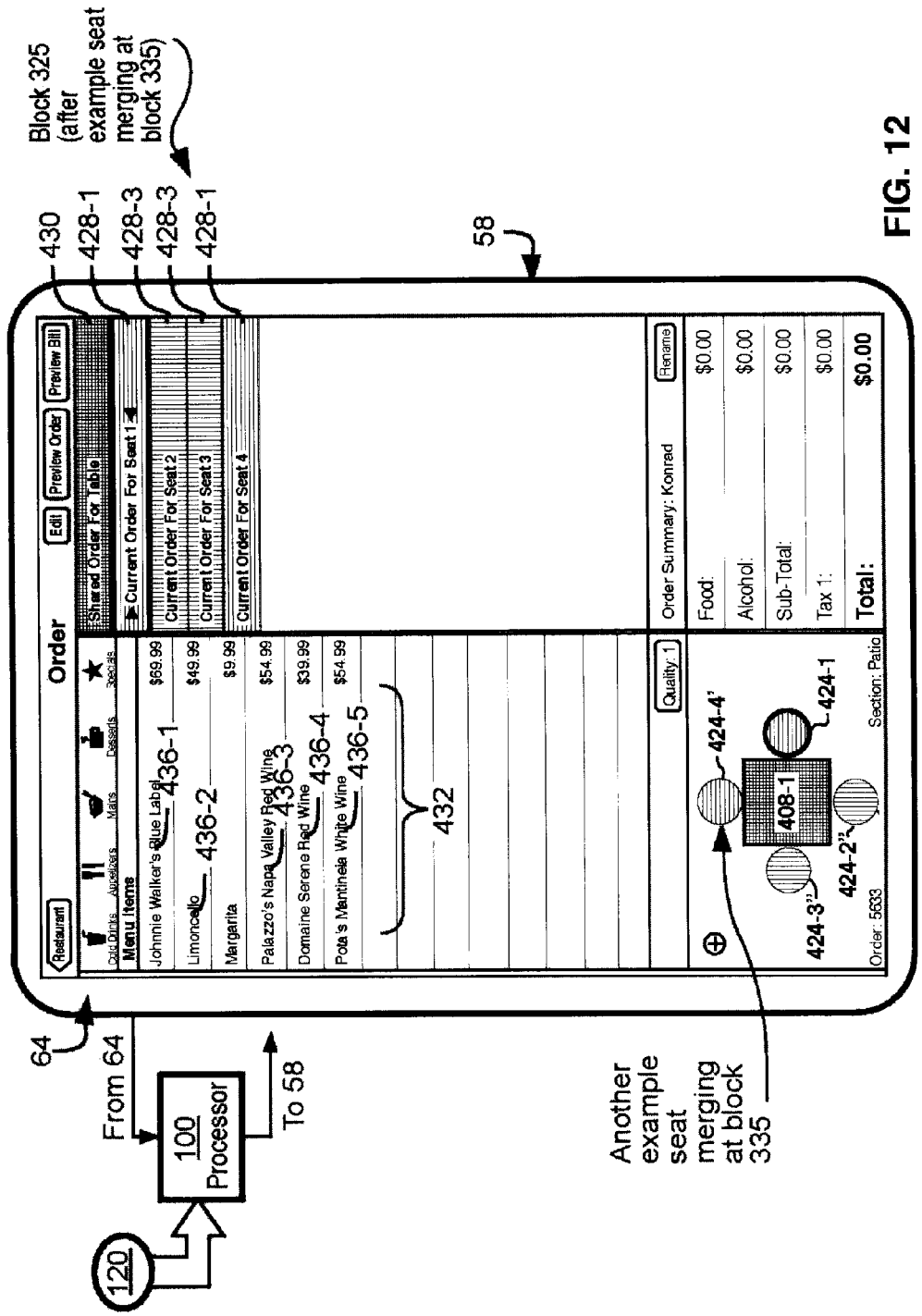
FIG. 12 shows the display and processor of the apparatus of FIG. 1 during example performance of certain blocks of the method of FIG. 3.

The person skilled in the art will now recognize that the examples in FIG. 9, FIG. 10, and FIG. 11 are not exhaustive. Indeed, one further illustrative example is shown in FIG. 12, whereby seat 424-3" and seat 424-2" are shown as merged into the Blue Set and are associated with account 428-3, while seat 424-4' and seat 424-1 are shown as merged into the Red Set and are both associated with account 428-3. Other merging possibilities are thus contemplated by application 120 according to the current embodiment. Furthermore, the person skilled in the art will now recognize that the teachings herein can be applied to any furnishing 408 having two or more seats 424.

The examples in FIG. 9, FIG. 10, FIG. 11 and FIG. 12 in relation to block 335 all reflect merging operations whereby seats 424 are merged into one or more common accounts 428. And, as noted earlier, other merging of seats 424 into common accounts 428 are contemplated. Indeed one of the advantages of the present invention will now be apparent, in that a server can use application 120 and apparatus 50 to not only take orders from menu 432 (discussed further below) but to also establish how many final invoices are to be generated for the patrons occupying seats 424, and how those invoices will be grouped.

However, it is also contemplated that such merging may be reversed, such that seats 424 that are currently merged into a single set can be unmerged and divided out into separate sets. Accordingly, block 330 also contemplates reception of an instruction to separate seats 424 that are presently merged into one account 428 into separate sets and corresponding accounts 428. For example, just as the example shown in FIG. 10 contemplates a merging that results in the example shown in FIG. 11, the reverse is true also, whereby an instruction received in the state shown in FIG. 11 can indicate, for example, that seat 424-2' should be separated from the Red Set and account 428-1 and placed within its own Yellow Set and assigned its own account 428-2 to thereby lead to the state shown in FIG. 10.

Returning again to the discussion of block 330, a "no" decision at block 330 leads to block 340. Block 340 comprises determining if input has been received that represents an instruction to update an order. If a "yes" determination is made at block 340, block 345 is invoked. Block 345 comprises updating an account associated with the order update from Block 340. Again, the technological means by which block 340 and block 345 can be implemented are not particularly limited. However, FIG. 13 continues with the illustrative embodiment from FIG. 9. Recall FIG. 9 shows that seats 424-1 and 424-4' have been merged into a single account 428-1. Also recall that FIG. 9 contemplates that seat 424-1 is currently selected, the indication of which is represented by the bolding surrounding the graphic representing seat 424-1. Accordingly, FIG. 13 contemplates that menu item 436-3 "Margarita" is touched as part of an example performance of block 340, which then results in invocation of block 345 whereby the menu item "Margarita" is populated under the heading associated with seat 424-1.

Figure 13:
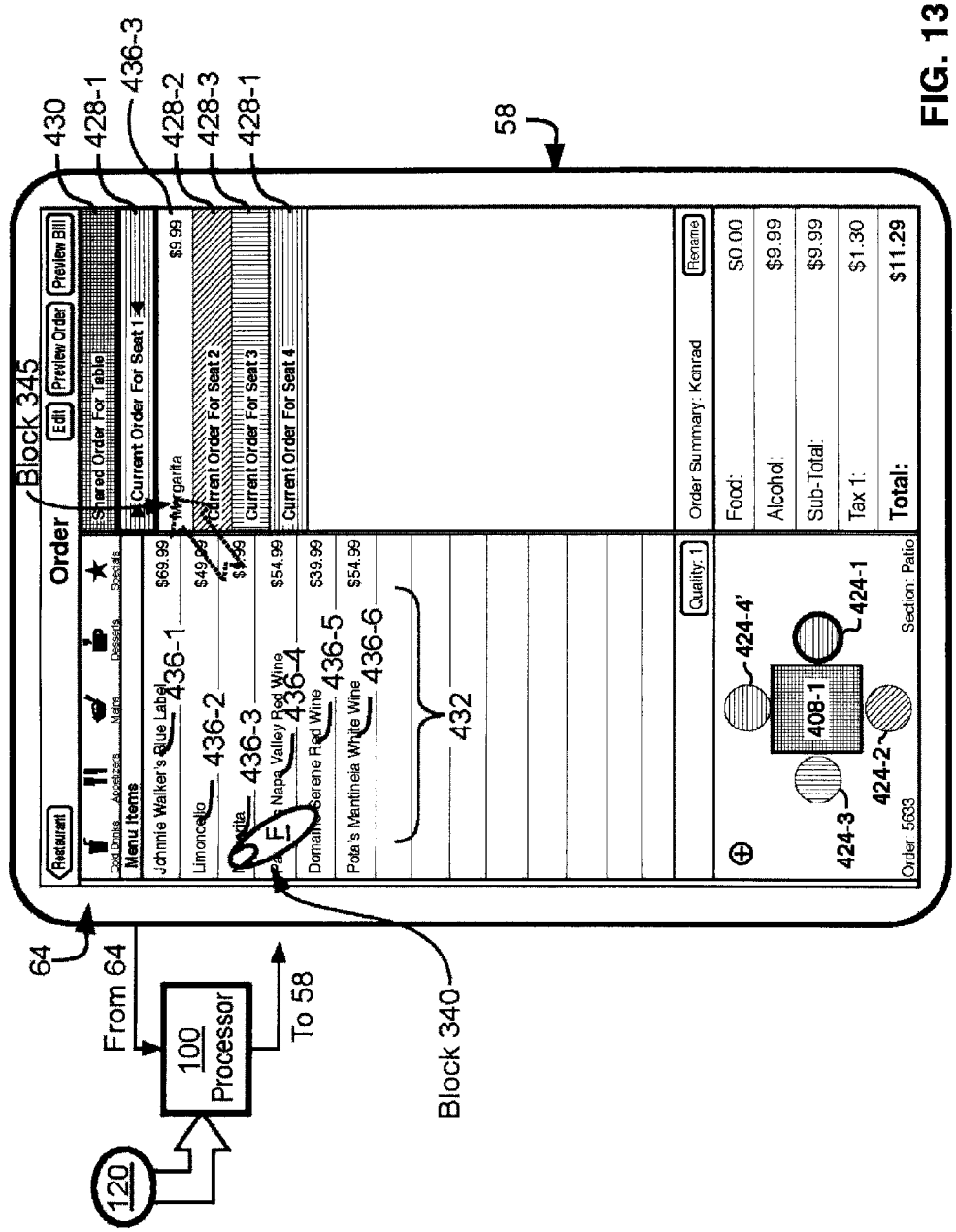
FIG. 13 shows the display and processor of the apparatus of FIG. 1 during example performance of certain blocks of the method of FIG. 3.
Figure 14:
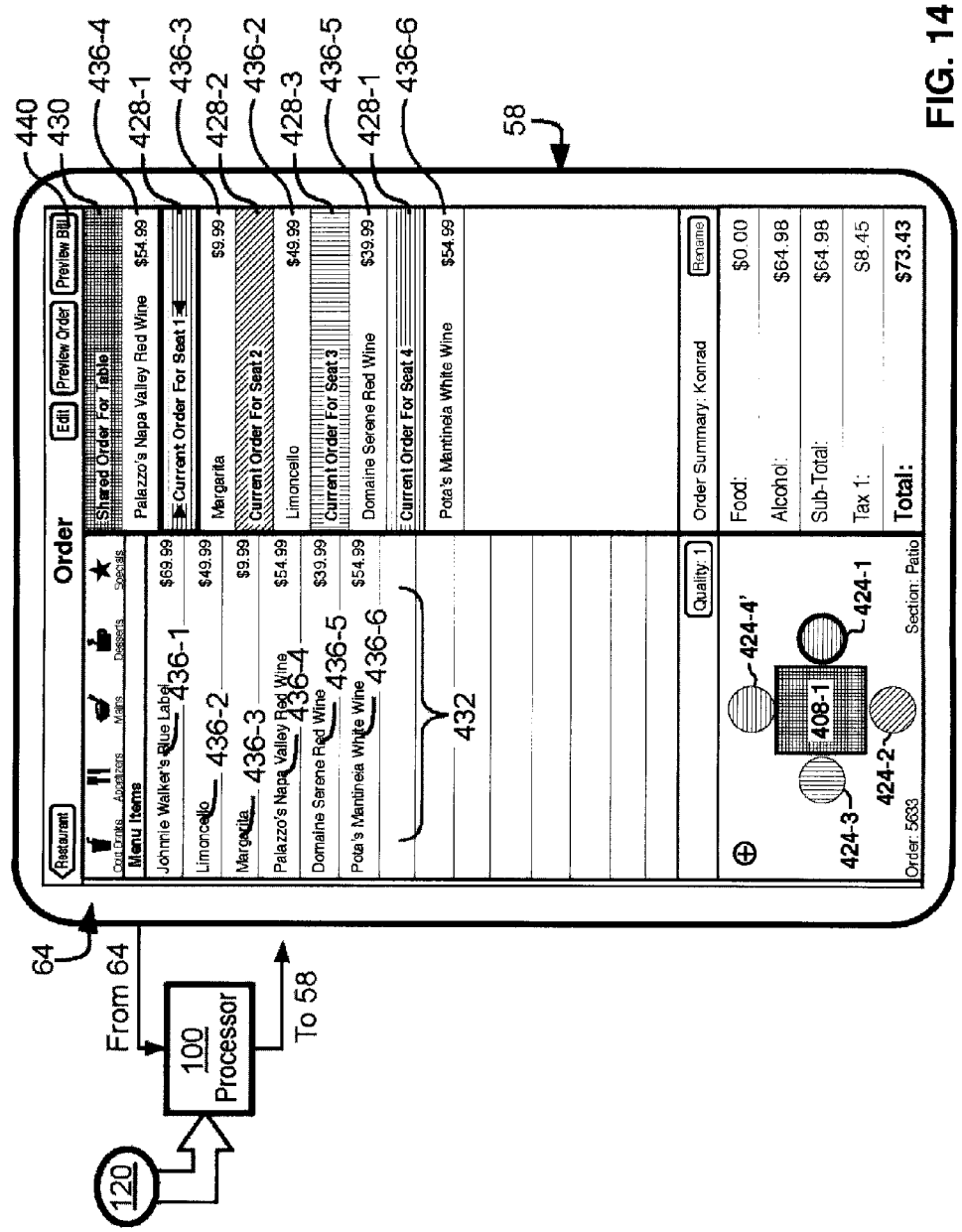
FIG. 14 shows the display and processor of the apparatus of FIG. 1 during example performance of certain blocks of the method of FIG. 3.

The methodology in discussed in FIG. 13 can be repeated for each seat 424 and/or furnishing 408-1 and thereby populate an order for each seat 424 and/or furnishing 408-1. An example of such repetition is shown in FIG. 14, whereby it can be noted that menu item 436-4 "Palazzo's Napa Valley Red Wine" has been added to shared account 430 in association with furnishing 408-1; menu item 436-3 "Margarita" has been added to account 428-1 in association with seat 424-1; menu item 432-2 "Limoncello" has been added to account 428-2; menu item 436-5 "Domaine Serene Red Wine" has been added to account 428-3; and menu item 436-6 "Pota's Mantinela White Wine" has been added to account 428-1.

Again, it can be noted that while seat 424-4' is shown as having ordered menu item 436-6 and seat 424-1 is shown as having ordered menu item 436-3, both menu items are associated with a single account 428-1 due to the fact that seat 424-4' and seat 424-1 are both part of the Red Set. However, the Blue Set is uniquely associated with seat 424-3 and account 428-3, and the Yellow Set is uniquely associated with seat 424-2 and account 428-3.

Block 350 comprises determining if input representing an instruction to generate invoices has been received. Block 350 can be reached from a "no" determination at block 340, or directly from block 345. A "No" determination at block 350 leads back to block 330. Thusly, it can be noticed that even after orders have been made, it is possible to dynamically re-associate seats 424 with different sets and corresponding accounts 436.

Various ways to effect the determination at block 350 are contemplated. As but one example, a "yes" determination can be made at block 350 if the "Preview Bill" virtual button 440, as shown in FIG. 14, is touched. Otherwise a "no" determination is made at block 350. Assuming a "yes" determination is made at block 350, then block 355 is invoked. Block 355 comprises generating an invoice for each account. Example performance of block 355 is shown in FIG. 15, FIG. 16 and FIG. 17.

Figure 15:
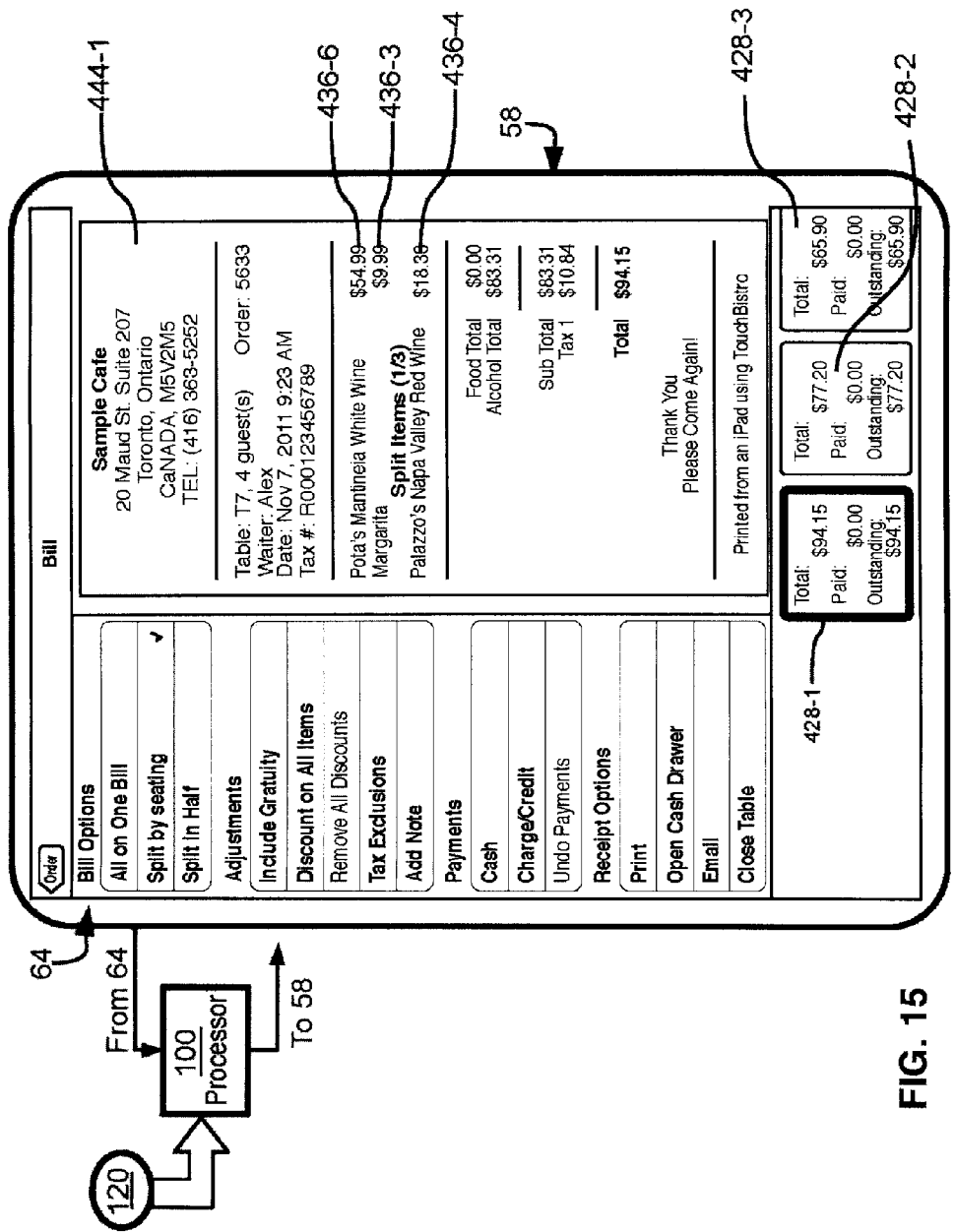
FIG. 15 shows the display and processor of the apparatus of FIG. 1 during example performance of certain blocks of the method of FIG. 3.

FIG. 15 shows a first invoice 444-1 that is generated for account 428-1. Note that in FIG. 15, account 428-1 is highlighted in the bottom centre of display 58, to thereby indicate that invoice 444-1 is associated with the Red Set and account 428-1. Note that invoice 428-1 includes: a) menu item 436-6 which was previously ordered by seat 424-4; b) menu item 436-6 which was previously ordered by seat 424-1; and c) a one-third split of menu item 436-4 which was derived from shared account 430 as it was ordered on behalf of the entire table and therefore associated with furnishing 408-1.

Figure 16:
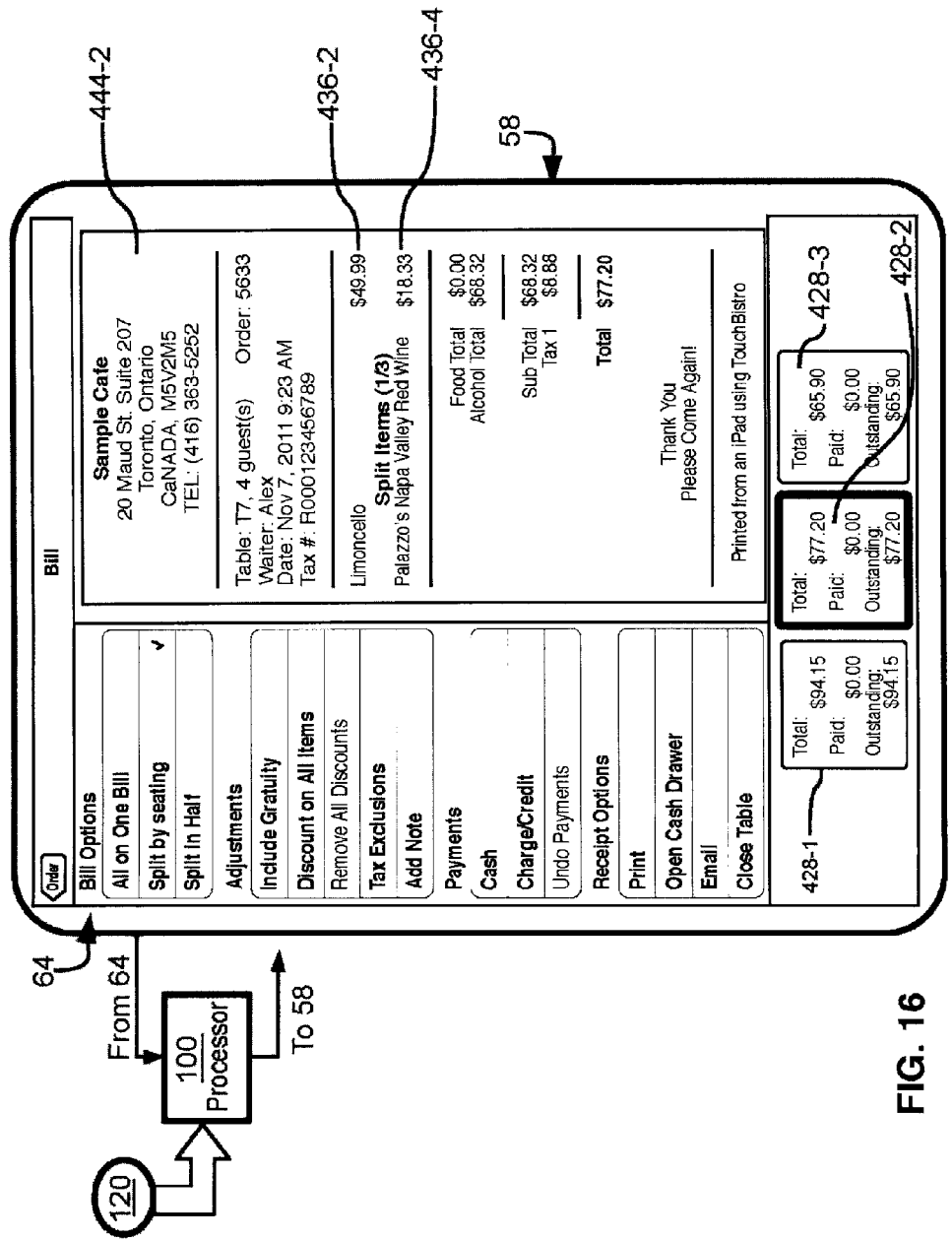
FIG. 16 shows the display and processor of the apparatus of FIG. 1 during example performance of certain blocks of the method of FIG. 3.

FIG. 16 shows a second invoice 444-2 that is generated for account 428-2. Note that in FIG. 16, account 428-2 is highlighted in the bottom centre of display 58, to thereby indicate that invoice 444-2 is associated with the Yellow Set and account 428-2. Note that invoice 428-2 includes: a) menu item 436-2 which was previously ordered by seat 424-2; and b) a one-third split of menu item 436-4 which was derived from shared account 430 as it was ordered on behalf of the entire table and therefore associated with furnishing 408-1.

Figure 17:
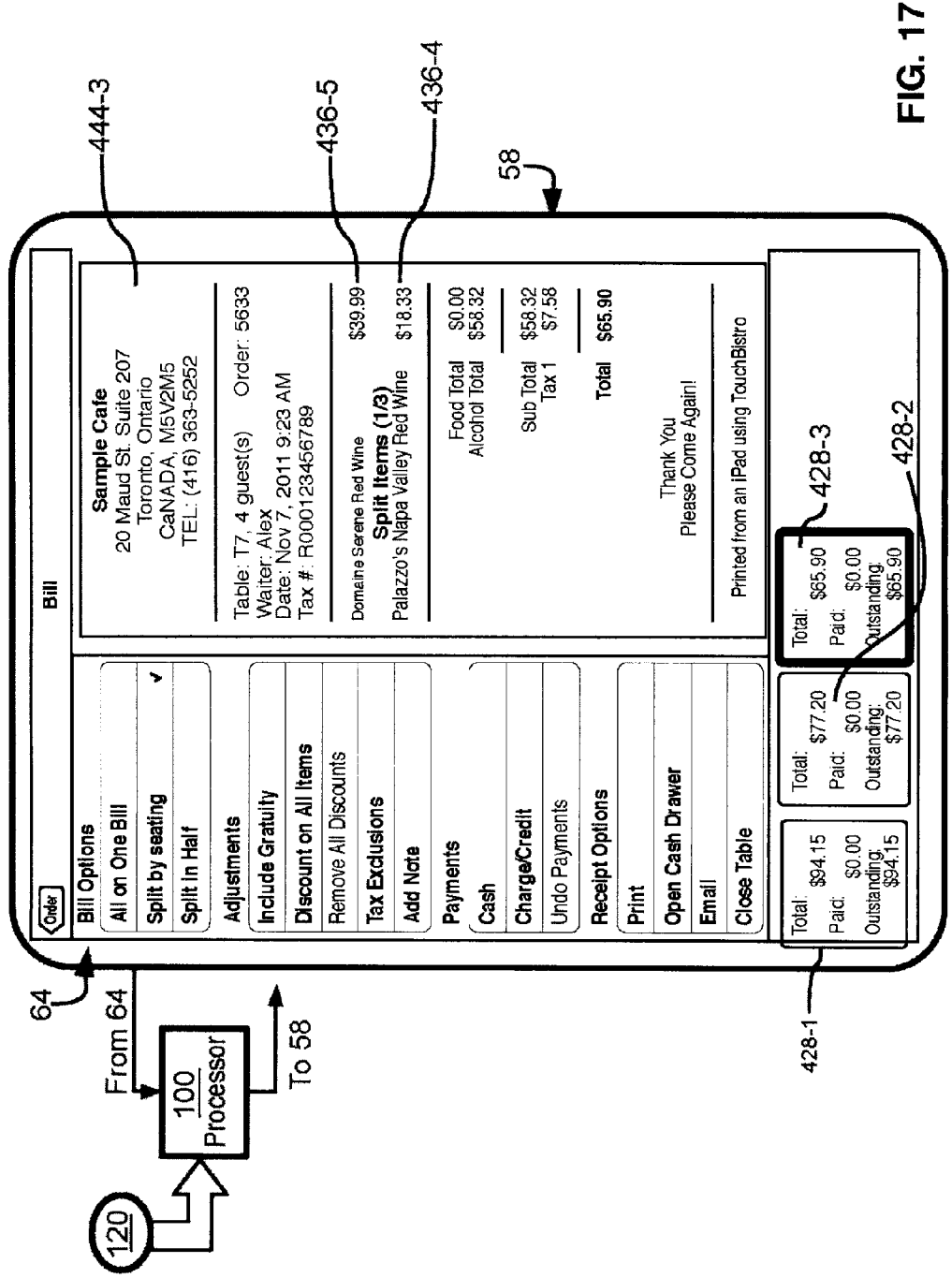
FIG. 17 shows the display and processor of the apparatus of FIG. 1 during example performance of certain blocks of the method of FIG. 3.

FIG. 17 shows a third invoice 444-3 that is generated for account 428-3. Note that in FIG. 17, account 428-3 is highlighted in the bottom centre of display 58, to thereby indicate that invoice 444-3 is associated with the Blue Set and account 428-3. Note that invoice 428-3 includes: a) menu item 436-5 which was previously ordered by seat 424-4; and b) a one-third split of menu item 436-4 which was derived from shared account 430 as it was ordered on behalf of the entire table and therefore associated with furnishing 408-1.

In a present embodiment, the views shown in FIG. 15, FIG. 16 and FIG. 17 can be changed by use of a touch gesture or a swipe gesture applied to the visual representations of respective accounts 428 as shown in the bottom centre of display 58 on those Figures. However, other ways of generating the views of invoices 444 are contemplated.

At this point method 300 can end, however method 300 also contemplates block 360 which comprises a variety of other processing options. For example, it can be noted that the views shown in FIG. 15, FIG. 16 and FIG. 17 also reflect functionality of application 120 to accommodate different bill options, bill adjustments, payment options, and receipt options.

Bill options include the ability to bundle all of the accounts 428 into a single invoice, effectively merging all accounts 428 into one and over-riding the processing at block 335. Bill options also include split by seating, which reflects the functionality shown in FIG. 15, FIG. 16 and FIG. 17. Bill options also include split-in-half, which merges all accounts 428 into one account and then divides that amount into two and generates two separate invoices accordingly.

Bill adjustments include the ability to add gratuities, or to apply discounts, or to enter tax exclusions, or to add a note to be printed on the invoices.

Payment options include the ability to process payment of the invoices 444 by cash or credit card. Other payment options are contemplated, such as the ability to process invoices 444 using PayPal™, or to accept email money transfers, or to accept other forms of payment (e.g. payments through mobile telephone technology), that are available now or developed in the future. A prepayment option is also contemplated to validate that funds are available to satisfy payment of a particular account 428 as it accumulates.

Receipt options include the ability to print the invoices 444 at a remote printer, email the invoice(s) to designated email address, or to close-the-table, meaning closing all accounts 444 altogether. Open-cash-drawer is also contemplated as an instruction that can remotely open a central cash drawer for storing cash received in satisfaction of invoice payments.

It is also contemplated, even if not expressly shown in method 300, that block 360 can comprise receiving partial payment, or payment in full of any outstanding amounts, but then returning to block 340 so that further ordering can be effected. This can be effective in tapas restaurants, or bars serving alcohol, where it can be desired to periodically settle a client's invoice prior to permitting further orders.

Figure 18:
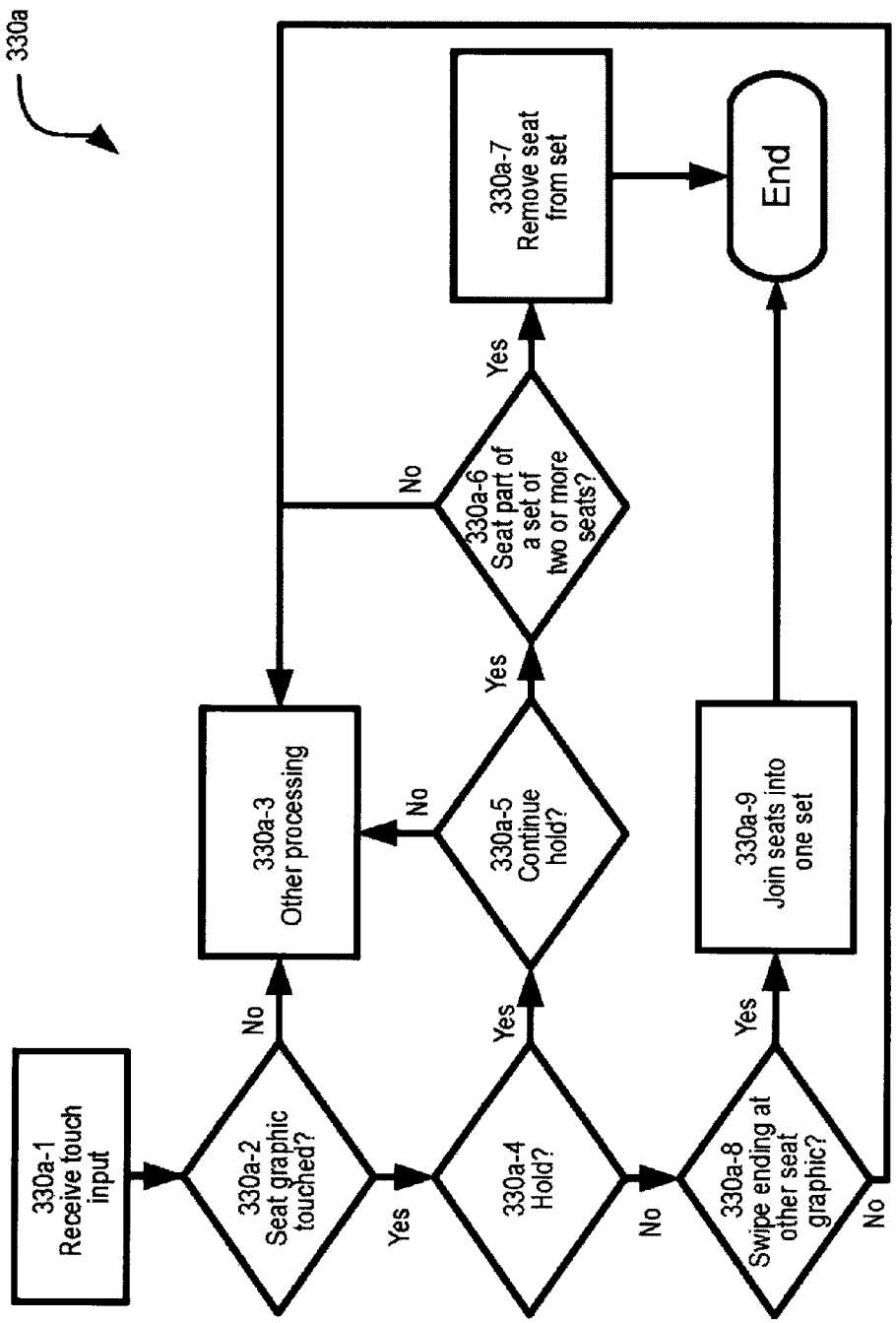
FIG. 18 is a flowchart for another method for controlling a display in response to input that can be implemented on the apparatus of FIG. 1.

This concludes the general discussion of method 300, but it is to be emphasized that other variations and enhancements to method 300 are contemplated. For example, as noted above, a variety of ways of implementing block 330 are contemplated. However, one particular presently preferred approach to implement block 330 is indicated in a flowchart in FIG. 18 and indicated generally as method 330a.

Figure 19:
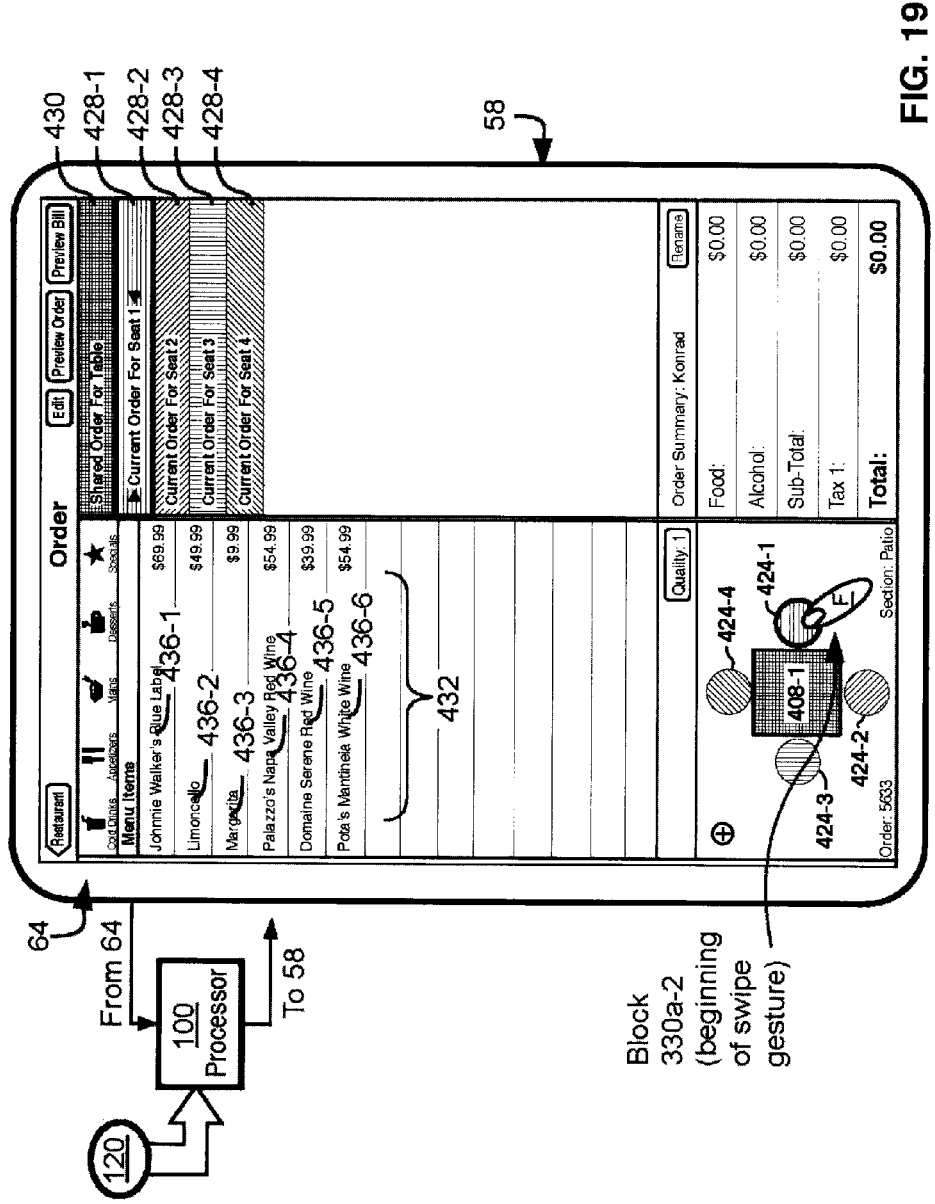
FIG. 19 shows the display and processor of the apparatus of FIG. 1 during example performance of certain blocks of the method of FIG. 18.

Block 330a-1 comprises receiving a touch input. In the context of application 120 and the examples given above, detection of a touch input is effected by processor 100 receiving an electronic signal from touch membrane 64 that a location on the area bounded by display 58 has been touched with a finger or a stylus or other activating apparatus. This example is shown in FIG. 19, where finger F is shown as depressing the graphic representing seat 424-1.

Block 330a-2 comprises determining if a seat graphic has been touched. A "no" determination leads to other processing at block 330a-3. Such other processing can be configured as desired. A "yes" determination leads to block 330a-4.

Block 330a-4 comprises determining whether the selected seat graphic is being held. In other words, if the touch gesture signal received at block 330a-1 does not change for a predefined period of time (e.g. one half second) then a "yes" determination is made which leads to block 330a-5, and which will be discussed further below. However, if there is any change then a "no" determination is made leading to block 330a-8.

Figure 20:
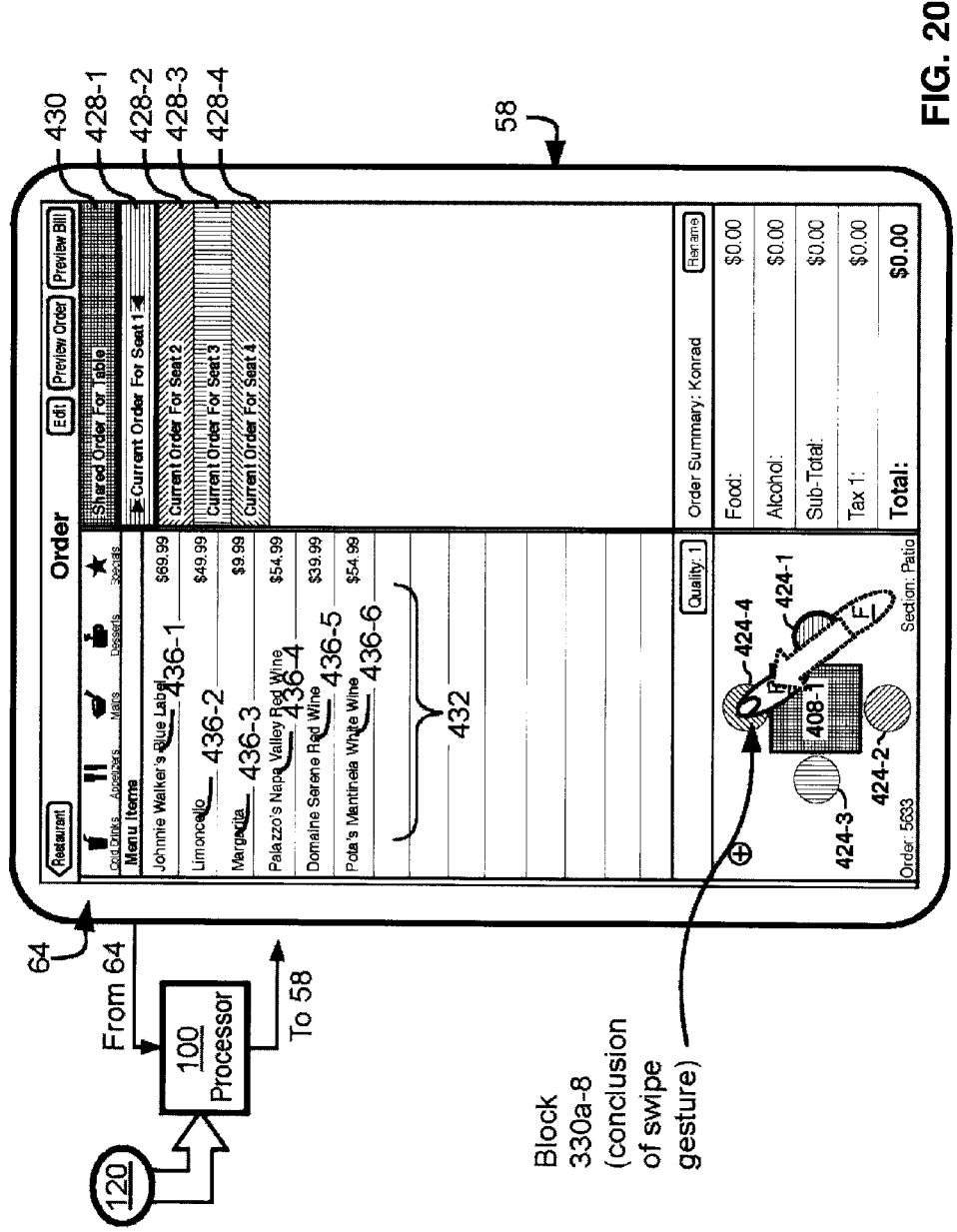
FIG. 20 shows the display and processor of the apparatus of FIG. 1 during example performance of certain blocks of the method of FIG. 18.

Block 330a-8 comprises determining if there is a swipe gesture that ends at another seat graphic. Example performance of block 330a-8, which leads to a "yes" determination, is shown in FIG. 20. FIG. 20, itself is an example transition from the state shown in FIG. 19. In FIG. 20, the completion of a swipe gesture is shown whereby finger F begins by depressing the graphic representing seat 424-1 and then is moved, while remaining in contact with touch membrane 64, to the graphic representing seat 424-4, at which point finger F is removed from contact with touch membrane 64. The foregoing leads to a "yes" determination which then brings method 330a to block 330a-9, at which point the two seats 424 corresponding to the beginning and the end of the swipe are merged into a single set. The result of the example in FIG. 20 leads to the state shown in FIG. 9, whereby seat 424-1 and seat 424-4' are merged into the Red Set and now jointly associated with account 428-1. In another example, seat 424-1 and seat 424-4' could be merged into the Pink Set.

If those two seats 424 are already part of a single set in a present embodiment, no processing occurs as they are already in a single set. But in a variation of method 330a, the swipe gesture as described in relation to two previously merged seats 424 could be interpreted as an instruction to remove one of the seats from the set, thereby splitting the two merged seats 424 into two different sets.

Returning now to block 330a-4, a "yes" determination will be reached if the touch gesture on the graphic representing the seat 424 is depressed and then held. Method 330a also includes a further (and optional) decision block 330a-5, which determines whether the graphic representing the seat 424 continues to be held. Expressed differently, the touch-and-hold gesture is interpreted differently depending on how long the depression of the selected seat 424 is held. For example, a "yes" determination can be made a block 330a-4 if the graphic is selected and held for more than about one second, and a "yes" determination is made at block 330a-5 if the graphic is selected and held for more than about two seconds, but a "no" determination is made at block 330a-5 if the graphic is selected and held for more than one second but less than two seconds.

Assuming block 330a-6 is reached, a determination is made if the selected seat is part of a set of two or more seats. If a "yes" determination is made at block 330a-6, then a "yes" determination is made and then at block 330a-7, the selected seat is removed from its current set and placed back into its own unique set. As a concrete example, block 330a-7 contemplates a transition from the state shown in FIG. 9 to the state shown in FIG. 7, whereby seat 424-4' is removed from the Red Set and placed back into its own, unique, Pink Set.

Figure 21:
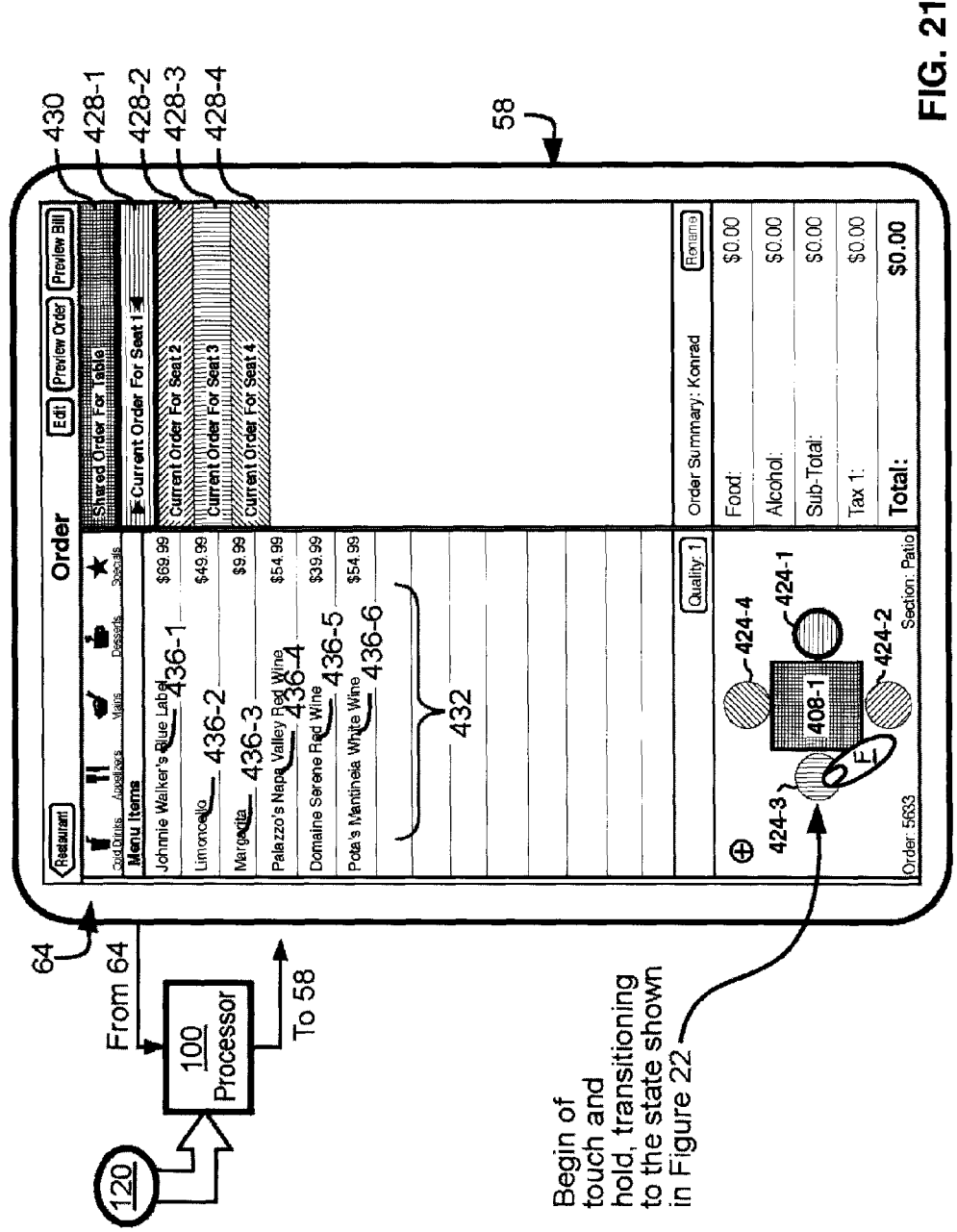
FIG. 21 shows the display and processor of the apparatus of FIG. 1 during example performance of certain blocks of the method of FIG. 18.
Figure 22:
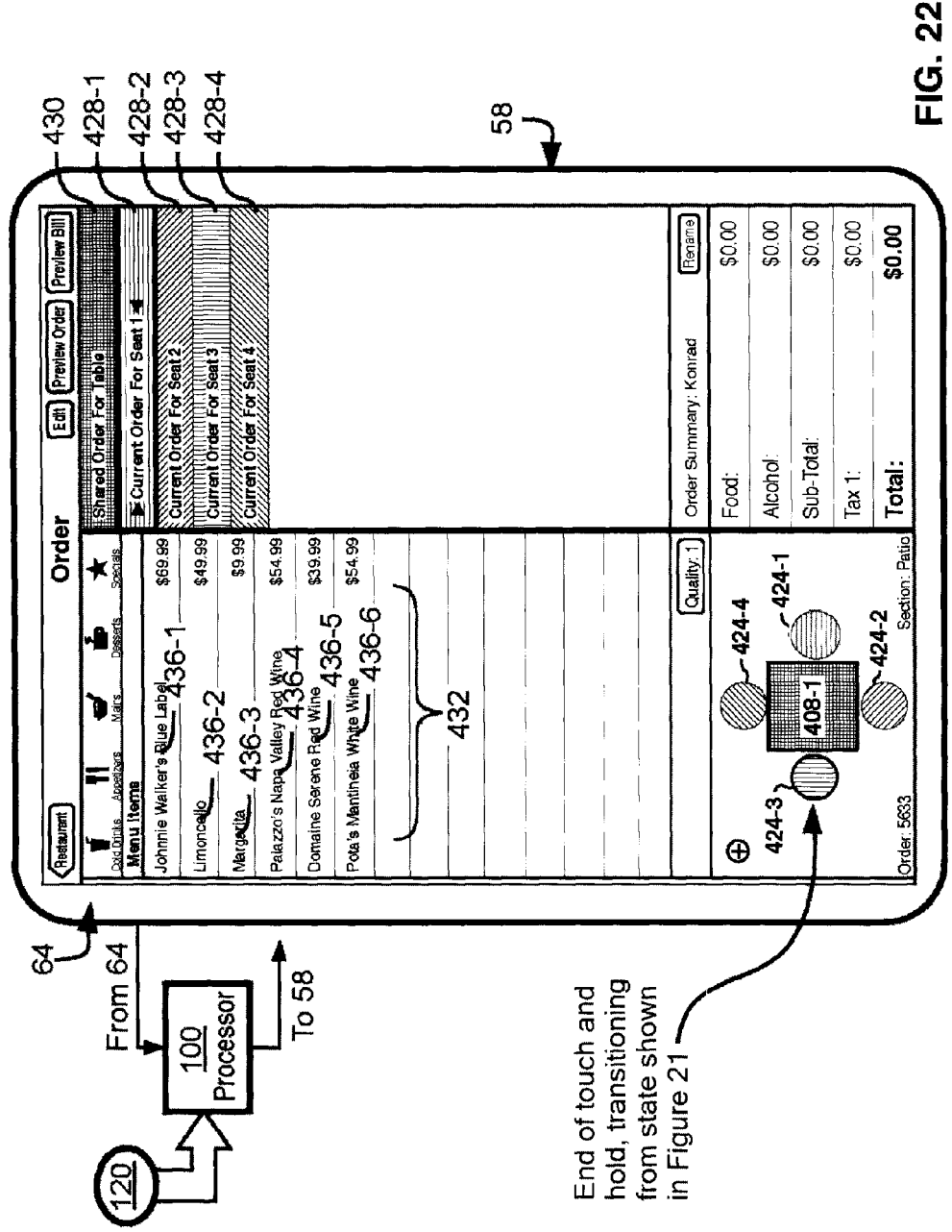
FIG. 22 shows the display and processor of the apparatus of FIG. 1 during example performance of certain blocks of the method of FIG. 18.

If a "no" determination is made at block 330a-5, then block 330a-3 is reached where other processing can be configured to occur. One example of possible further processing is in FIG. 21 and FIG. 22. FIG. 21 reflects the same state shown in FIG. 7, but contemplates that seat 424-3 is touched by Finger F and held long enough to result in a "yes" determination at block 330a-4, but short enough to result in a "no" determination at block 330a-5. The result, shown in FIG. 22, is that seat 424-3 is now encircled in a bold line, while the bold encircling is now removed from seat 424-1 Application 120 is thus configured to interpret this gesture as an instruction to cause seat 424-3 to become "selected" and so that the remaining seats become "unselected". The selection is also reflected by highlighting of account 428-3. As a result of such selecting, any items selected from menu 432 will be added to the order associated with seat 424-3 and account 428-3.

It is to be understood that modifications, variations, enhancements and combinations thereof are contemplated. For example, while the foregoing contemplates a touch membrane 64 responsive to touch gestures, it is contemplated that other input devices can also be provided to supplement or replace touch membrane 64, such as, by way of non-limiting example a mouse, a track pad, or a track ball, using a more traditional paradigms associated with those devices, such as "point and click" or "point, click, drag and unclick", rather than using touch gestures. These modifications can be incorporated into method 300 or method 330*a*. The specific teachings herein can be modified to accommodate such other input devices.

As another example, application 120 can be modified to work in other types of invoicing contexts. For example, a snow shoveling service that is working on a driveway that is shared between two homes may wish to use a suitably modified version of application 120 to split the invoice for snow clearing. Application 120 can be configured to accommodate a shared service, such as the snow clearing itself, and a non-shared portion, such an order of salt for one half of the driveway corresponding to one home, while the other home would not receive any salt. The final invoices generated according to the present teachings would include a shared portion representing the snow shoveling, and would also include an individualized portion for one home representing an additional charge for the salting. Various other contexts will now occur to the skilled reader where certain goods or services may be equally shared, while certain specific goods or services may be attributable only to specific entities or individuals that ordered those specific items. As another example, a landscaping service servicing a townhouse development having overalapping common area and private areas could benefit from the present teachings. Such a landscaping service could offer lawn cutting that is shared amongst all owners across the common area and all private areas, but then could also offer private services, such as lawn weeding, to individual townhouses while omitting provision of such services to other individual townhouses. The teachings herein can be modified to accommodate such a landscaping service. The present teachings provide an elegant graphical interface for managing such complexities.

Figure 23:
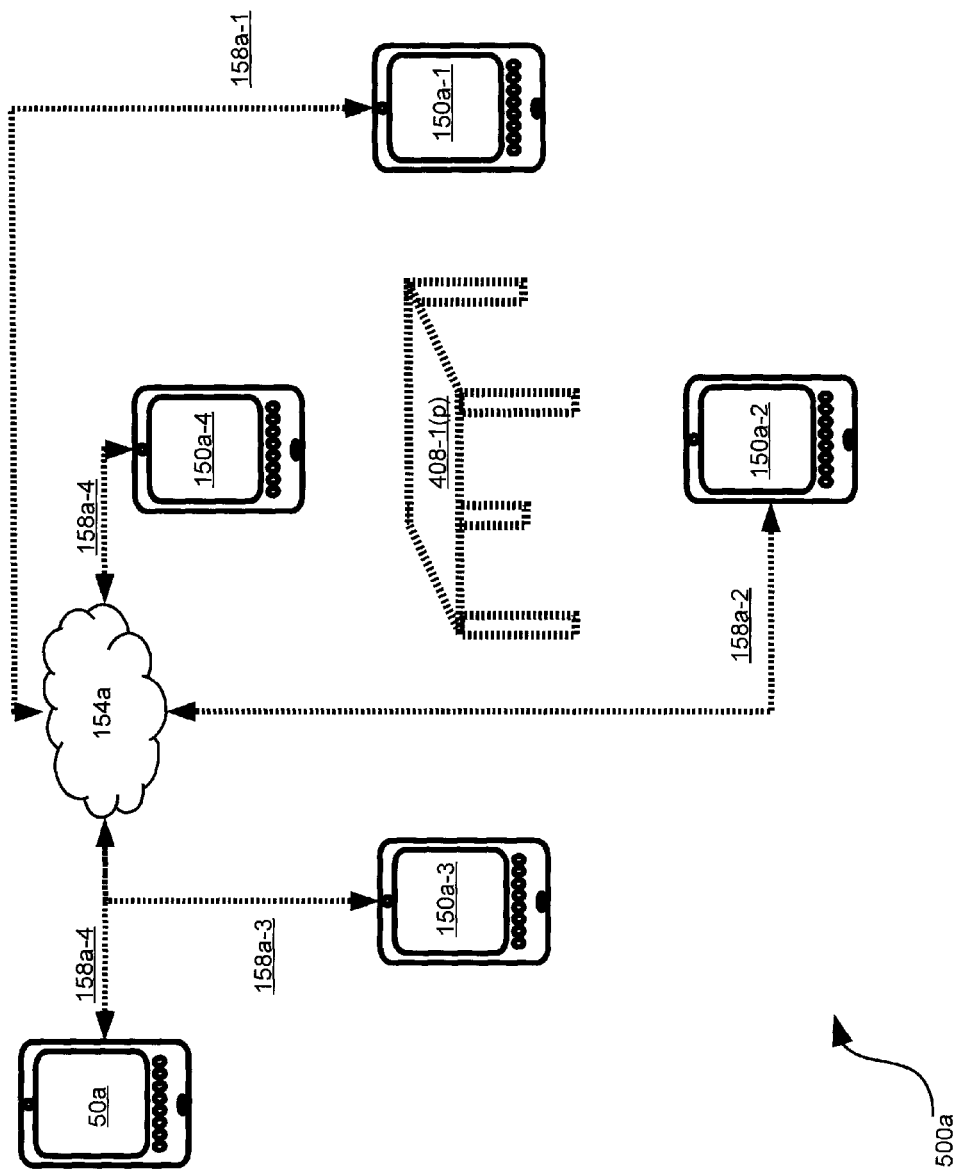
FIG. 23 shows an alternative embodiment of a system for allocating an invoice amongst a plurality of accounts.

Another embodiment of the present invention is shown in FIG. 23 as a system for allocating an invoice amongst a plurality of accounts and indicated generally at 500*a*. System 500*a* incorporates an enterprise apparatus 50*a* which is based on the functionality portable electronic apparatus 50, and is associated with a hospitality enterprise such as a restaurant. System 500*a* also includes a plurality of client apparatus 150*a*, which are also based on the functionality of portable electronic apparatus 50, but are each associated with individual patrons. Enterprise apparatus 50 and client apparatus 150*a* are all interconnected by a network 154*a* via respective links 158*a*. The means by which network 154*a* and links 158*a* are implemented are not particularly limited. For example, network 154*a* can be a WiFi network hosted by the hospitality enterprise, and as such links 158*a* are WiFi links. Network 154*a* and links 158*a* can also be wide area network such as a core mobile network data infrastructure (e.g. EDGE, 3G, 4G), that is configured to carry data between apparatus 50 and apparatus 150*a*. Network 154*a* and links 158*a* can also be based on pure peer-to-peer infrastructures such as Bluetooth™. Hybrids and/or handovers between the infrastructures can also be accommodated in system 500*a*.

In system 500*a*, an example physical table 408-1(*p*) is shown, which in the previous examples is electronically represented as furnishing 408-1 in the examples discussed above in relation to apparatus 50. Other example aspects of system 500*a* are also related back to the examples discussed above in relation to apparatus 50. In particular, apparatus 150*a*-1 is contemplated to be associated with seat 424-1; apparatus 150*a*-2 is contemplated to be associated with seat 424-2; apparatus 150*a*-3 is contemplated to be associated with seat 424-3; and apparatus 150*a*-4 is contemplated to be associated with seat 424-4. While the example in relation to system 500*a* is related back to the example in relation to apparatus 50, it is to be understood that the example is illustrative and that system 500*a* is a separate embodiment from apparatus 50. The person skilled in the art will now recognize, however, that system 500*a* contemplates an implementation of a networked or client-server version of application 120, whereby certain functionality of application 120 is implemented on apparatus 50, while other functionality is implemented on each individual apparatus 150*a*. In a presently contemplated embodiment, apparatus 50*a* can be implemented as a tablet computer such as an iPad™ or an Android™ Tablet or a BlackBerry™ Playbook™, while apparatus 150*a* can be implemented as a mobile telephony device such as an iPhone™ or an Android™ smart phone or a BlackBerry™ smart phone. However, there is no real limit on the type or form factor of device used to implement apparatus 50*a* or apparatus 150*a*.

Thus, in system 500*a*, functionality of apparatus 50 is enhanced as various features of application 120 can be made directly accessible not only to an operator (e.g. wait-staff) of enterprise apparatus 50*a*, but also to directly accessible to individual patrons (e.g. restaurant customers) of each client apparatus 150*a*. Of particular note, the seat merging functionality discussed in relation to method 330*a* can made be available on each of apparatus 50*a* and each apparatus 150*a*. In this way the merging or unmerging of accounts 428 can be established either via an individual apparatus 150*a*, or via apparatus 50*a*. As another example, the entirety, or a portion of, the menu ordering functionality can be made available on each apparatus 150*a*. It is presently contemplated that the menu ordering functionality can be made available for each individual seat 424. Expressed in other words, apparatus 150*a*-1 can be configured to include at least a menu ordering function for its respective seat 424-1. Functionality of system 500*a* can be extended so that physical table 408-1(*p*) can be reserved in advance, and an order for each seat 424 can be made before patrons even sit at physical table 408-1(*p*). As another example, billing and payment functionality can also be made available at each apparatus 150*a* to permit settling of any account 428 associated with a given apparatus 150*a*. It will now be understood that any one or more of the features of application 120 as described in relation to apparatus 50 can be networked according to the physical infrastructure example shown in relation to system 500*a*.

In another embodiment of the invention, method 330*a* can be implemented as a stand-alone simplified "bill splitter" application on individual client machines, such as client apparatus 150*a*. Such a simplified "bill splitter" application it is contemplated would be optimized for mobile telephony devices such as an iPhone™, or Android™ or BlackBerry™, or even optimized for a mobile computing device such as an iPod™ Touch™. According to this embodiment, graphical interfaces can be provided that is limited to, one or more of, the "Add party" dialogue box in FIG. 6, followed by another graphical interface that is limited to the view of seats 424 and table 408-1 in FIG. 7 which is interactive according to method 330a so that various merged and/or unmerged accounts 428 can be established using method 330a. Another graphical interface can also be provided whereby a total amount is entered, and then a final graphical interface can be provided that shows individual invoices, such as invoices 444 shown in FIG. 16, to show the amounts that are being split.

In another embodiment, it is it to be understood that the functionality of application 120, and in particular method 330a can be extended to other data paradigms. For example: a) menu 432 can be abstracted generally as a set of data items that can be assigned to different accounts; b) the seating set functionality of block 330, block 335 and method 330a can be abstracted generally as a set definition function; and c) the order update function associated with block 340 and block 345 can be generally as a data item assignment function whereby data items are assigned to the defined sets, and d) the functionality associated with generating invoices at block 350 and block 355 can be abstracted generally as a data assignment processing function based on the set definitions and the item assignments. In this way, it will now be understood that the teachings herein can be extended to other item assignment applications. For example, data items can include names of individual members of an overall group (e.g. a Cub Scout Troop from the Boy Scout movement), set assignments can represent possible sub-groups (e.g. "Sixes" within the Cub Scout Troop), and data assignment processing can be a printout of the names of the individuals assigned to each "Six".

In another embodiment, the seating set functionality of block 330, block 335 and method 330a can be abstracted generally as a set definition function which can be implemented as its own stand-alone application usable in different contexts. As an illustrative example, method 330a could be used as a novel and graphical way to assign email addresses to "to", "cc" and "bcc" fields of an email, where each of the "to", "cc" and "bcc" represent different sets.

Various advantages will now be apparent. For example, the present invention provides a novel graphical interface for assigning individual data items (e.g. menu items) to different sets (e.g. seating sets and accounts). Likewise the present invention provides a novel graphical interface for defining and redefining sets (e.g. defining groupings of seats that will share portions of an overall restaurant bill).

The invention claimed is:

1. A computer-implemented method for a graphical user interface (GUI) for defining one or more accounts for invoicing goods or services comprising:
generating, on a touch-screen display of an electronic apparatus installed at a hospitality establishment, said GUI including a first icon in association with a graphical representation of at least one seating layout of said hospitality establishment, wherein said first icon represents a first seat of said at least one seating layout;
defining, in a computer memory, a first account respective to said first icon;
generating, on said touch-screen display, a second icon, wherein said second icon represents a second seat of said at least one seating layout;
defining, in said computer memory, a second account respective to said second icon;
receiving, via said GUI on said touch-screen display, input assigning one or more shared chargeable items to one or more tables of said at least one seating layout;
receiving a swipe gesture at said GUI on said touch-screen display, receiving said swipe gesture including receiving an initial touch on said touch-screen display at a location of said first icon and receiving an end touch on said touch-screen display at a location of said second icon along a line between said first icon and said second icon;
merging, in said computer memory, in response to said swipe gesture, said first account and said second account into a single account, said merging including accounting for said one or more shared chargeable items assigned to one or more tables of said at least one seating layout.

2. The method of claim 1 wherein the merging comprises moving data within the second account into the first account.

3. The method of claim 1 wherein said touch-screen display comprises a touch membrane.

4. The method of claim 1 further comprising populating food or beverage items ordered respective to said first seat associated with said first account and populating food or beverage items ordered respective to said second seat associated with said second account.

5. The method of claim 4 further comprising generating one or more of a first invoice respective to said first account; a second invoice respective to said second account, and a merged invoice respective to said single account.

6. The method of claim 1 further comprising receiving, via said GUI on said touch-screen display, a touch-and-hold gesture at one of said first icon and said second icon and in response splitting said single account back into said first account respective to said first icon and said second account respective to said second icon.

7. The method of claim 6 comprising repeating receiving said swipe gesture at said GUI on said touch-screen display in respect to two of said icons and merging accounts respective to said icons.

8. The method of claim 1 comprising at least one additional icon and at least one additional account respective to each said at least one additional icon.

9. The method of claim 1, wherein said accounting for the one or more shared chargeable items includes determining a total number of accounts associated with a table including any single accounts resulting from said merging, and dividing a value of a shared chargeable item among said total number of accounts.

10. The method of claim 1, further comprising receiving, via said GUI on said touch-screen display, input at said graphical representation of said at least one seating layout to dynamically change an association of seats with said one or more tables, said input updating accounts associated with said seats and updating one or more shared accounts assigned to said one or more tables.

11. The method of claim 1 further comprising displaying icons, including said first and second icons, representing seats on said touch-screen display using different colors, wherein at least two icons whose accounts have been merged into a single account are displayed in a same color and said single account is also displayed in said same color.

12. An apparatus for defining one or more accounts for invoicing goods or services, the apparatus comprising:
a processor configured to execute programming instructions;
a touch-screen display in communication with the processor, the touch-screen display configured to generate a graphical user interface (GUI) including a first icon and a second icon in association with a graphical representation of at least one seating layout of a hospitality establishment, wherein the first icon represents a first seat of the at least one seating layout and wherein the second icon represents a second seat of the at least one seating layout;

the touch-screen display configured to receive a swipe gesture at said GUI on said touch-screen display, receiving said swipe gesture including receiving an initial touch on said touch-screen display at a location of said first icon and receiving an end touch on said touch-screen display at a location of said second icon along a line between said first icon and said second icon, the touch-screen display further configured to receive an input for assigning items to one or more tables of the at least one seating layout including one or more shared chargeable items; and a computer memory in communication with the processor, the processor configured to define a first account respective to the first icon in the computer memory and to define a second account respective to the second icon in the computer memory, and wherein the processor is configured to merge the first account and the second account into a single account in the computer memory in response to receiving said swipe gesture, and wherein the processor is configured to account for the one or more shared chargeable items assigned to a table associated with one or more of the first seat and the second seat.

13. The apparatus of claim 12, wherein the processor is configured to move data within the second account into the first account.

14. The apparatus of claim 12, wherein the touch-screen display comprises a touch membrane.

15. The apparatus of claim 12, wherein the processor is further configured to populate food or beverage items ordered respective to said first seat associated with said first account and to populate food or beverage items ordered respective to said second seat associated with said second account.

16. The apparatus of claim 15, wherein the processor is further configured to generate one or more of a first invoice respective to said first account, a second invoice respective to said second account, and a merged invoice respective to said single account.

17. The apparatus of claim 16, wherein said GUI on said touch-screen display is further configured to receive a touch-and-hold gesture representing a selection of one of said first icon and said second icon, wherein the processor is further configured to split said single account back into said first account respective to said first icon and said second account respective to said second icon and in response to receiving the touch-and-hold gesture.

18. The apparatus of claim 12, wherein said processor is further configured to determine a total number of accounts associated with said table including any single accounts resulting from said merging, and to divide a value of a shared chargeable item among said total number of accounts.

19. The apparatus of claim 12, wherein the processor is configured to detect input at said graphical representation of said at least one seating layout to dynamically change an association of seats with said one or more tables, update accounts associated with said seats, and update one or more shared accounts assigned to said one or more tables.

20. The apparatus of claim 12, wherein the processor is further configured to display icons, including said first and second icons, representing seats on said touch-screen display using different colors, wherein at least two icons whose accounts have been merged into a single account are displayed in a same color and said single account is also displayed in said same color.

* * * * *